United States Patent
Im et al.

(10) Patent No.: US 12,381,651 B2
(45) Date of Patent: Aug. 5, 2025

(54) UE PERFORMING BLIND DECODING, COMMUNICATION SYSTEM INCLUDING THE SAME, AND OPERATION METHOD OF THE UE AND THE COMMUNICATION SYSTEM

(71) Applicant: Samsung Electronics Co., Ltd., Suwon-si (KR)

(72) Inventors: Juhyuk Im, Gunpo-si (KR); Daeson Kim, Seoul (KR); Hoguen Ji, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 426 days.

(21) Appl. No.: 17/539,710

(22) Filed: Dec. 1, 2021

(65) Prior Publication Data

US 2022/0182177 A1   Jun. 9, 2022

(30) Foreign Application Priority Data

Dec. 3, 2020 (KR) .................. 10-2020-0167662
Feb. 1, 2021 (KR) .................. 10-2021-0014401

(51) Int. Cl.
*H04L 1/00* (2006.01)
*H04W 72/0453* (2023.01)
*H04W 72/23* (2023.01)

(52) U.S. Cl.
CPC ....... *H04L 1/0045* (2013.01); *H04W 72/0453* (2013.01); *H04W 72/23* (2023.01)

(58) Field of Classification Search
CPC .... H04L 1/0045; H04L 1/0038; H04W 72/23; H04W 72/0453
See application file for complete search history.

(56) References Cited

U.S. PATENT DOCUMENTS

| 9,537,634 B2 | 1/2017 | Seo et al. |
| 10,728,004 B2 | 7/2020 | Wang et al. |
| 11,032,824 B2 | 6/2021 | Hosseini et al. |
| 2008/0225786 A1 | 9/2008 | Han et al. |

(Continued)

FOREIGN PATENT DOCUMENTS

| KR | 10-2010-0053060 A | 5/2010 | |
| TW | 202029814 A | 8/2020 | |
| WO | WO-2019139300 A1 * | 7/2019 | ............... H04L 1/00 |

OTHER PUBLICATIONS

European Search Report dated Apr. 21, 2022 for corresponding EP Patent Application No. 21209503.8.

(Continued)

*Primary Examiner* — Derrick W Ferris
*Assistant Examiner* — Won Jun Choi
(74) *Attorney, Agent, or Firm* — Harness, Dickey & Pierce, P.L.C.

(57) ABSTRACT

An operating method of a terminal, the operating method includes determining a decoding priority of a plurality of aggregation levels based on reference information, the plurality of aggregation levels corresponding to a downlink control channel, performing candidate filtering-based blind decoding on one or more control channel candidates corresponding to the plurality of aggregation levels according to the decoding priority to obtain a decoding result, and receiving downlink control information based on the decoding result.

20 Claims, 21 Drawing Sheets

(56) References Cited

U.S. PATENT DOCUMENTS

| | | | |
|---|---|---|---|
| 2009/0088148 A1* | 4/2009 | Chung | H04L 1/0032 |
| | | | 455/423 |
| 2009/0154607 A1* | 6/2009 | Lindoff | H04L 1/0091 |
| | | | 375/341 |
| 2018/0083733 A1* | 3/2018 | Chen | H04L 1/0048 |
| 2019/0223164 A1 | 7/2019 | He et al. | |
| 2019/0268206 A1* | 8/2019 | Yang | H04L 5/0051 |
| 2019/0349911 A1* | 11/2019 | Seo | H04W 72/23 |
| 2020/0177306 A1* | 6/2020 | Choi | H04L 5/0053 |
| 2020/0280393 A1 | 9/2020 | Qu et al. | |
| 2020/0344616 A1 | 10/2020 | Hwang et al. | |
| 2020/0404669 A1* | 12/2020 | Seo | H04L 25/0238 |
| 2021/0067268 A1* | 3/2021 | Seo | H04L 25/0238 |

OTHER PUBLICATIONS

Extended European Search Report dated Sep. 13, 2022 for corresponding EP Patent Application No. 21209503.8.
Taiwan Office Action issued Apr. 8, 2025 in Taiwan Patent Application No. 110145244.

* cited by examiner

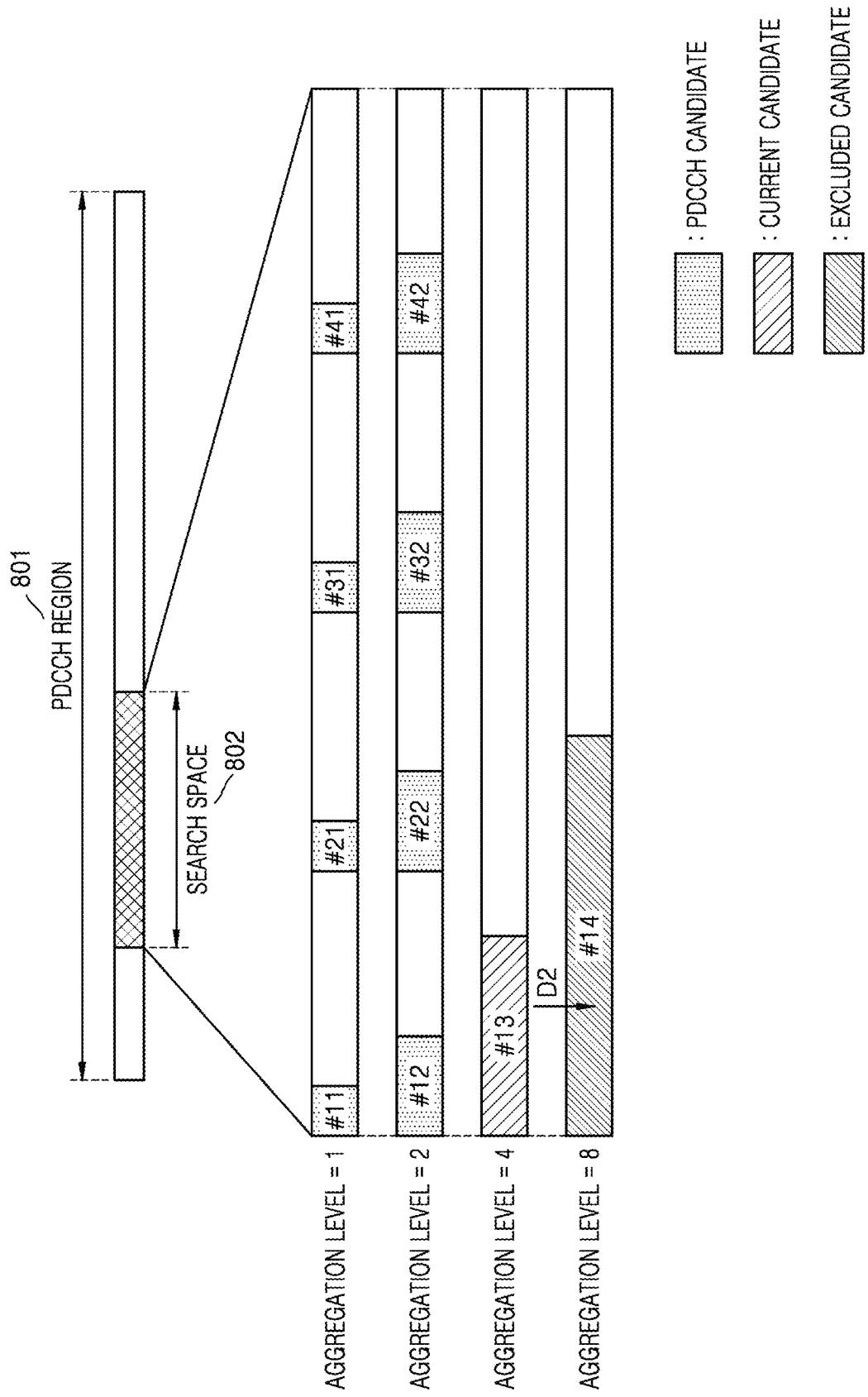

UE PERFORMING BLIND DECODING, COMMUNICATION SYSTEM INCLUDING THE SAME, AND OPERATION METHOD OF THE UE AND THE COMMUNICATION SYSTEM

CROSS-REFERENCE TO RELATED APPLICATIONS

This application is based on and claims priority under 35 U.S.C. § his application is based on and claim 10-2020-0167662 and 10-2021-0014401, filed on Dec. 3, 2020 and Feb. 1, 2021, respectively, in the Korean Intellectual Property Office, the disclosures of both of which are incorporated by reference herein in their entirety.

BACKGROUND

The inventive concepts relate to a terminal that performs blind decoding, a communication system including the same, and/or an operating method of the terminal and the communication system.

In order to support transmission of downlink and uplink transmission channels in a communication system, downlink control information (DCI) related thereto is used. A terminal may receive the downlink control channel from a base station, perform decoding on the downlink control channel, and receive the DCI based on results of decoding.

The downlink control channel may have various formats, and the terminal may not be previously aware of the format selected by the base station. In addition, because time/frequency resources defined as a search space may be transmitted through an arbitrary or unknown resource in a set, the exact time/frequency resource through which the downlink control channel is transmitted is not previously known to the terminal. Therefore, the terminal performs decoding on the downlink control channel based on blind decoding. Blind decoding refers to an operation of decoding a downlink control channel with respect to all possible downlink control channel formats and all possible time/frequency resource combinations in a given search space by the terminal.

The time/frequency resource combination on which blind decoding is performed may include control channel candidates included in each of a plurality of aggregation levels, and the terminal performs a decoding operation on each of the control channel candidates. In next-generation communication, as the number of aggregation levels and the number of control channel candidates increase, the time and power consumed by the terminal for blind decoding increase, which causes a challenge in the performance improvement of the terminal.

SUMMARY

The inventive concepts provide a terminal reducing time and power consumed in blind decoding by reducing operations in blind decoding, and ultimately improving communication performance, a communication system including the terminal, and an operating method of the terminal and the communication system.

According to an aspect of the inventive concepts, there is provided an operating method of a terminal including determining a decoding priority of a plurality of aggregation levels based on reference information, the plurality of aggregation levels corresponding to a downlink control channel, performing candidate filtering-based blind decoding on one or more control channel candidates corresponding to the plurality of aggregation levels according to the decoding priority to obtain a decoding result, and receiving downlink control information based on the decoding result.

According to an aspect of the inventive concepts, there is provided a terminal including processing circuitry configured to determine a decoding priority with respect to a plurality of aggregation levels based on reference information, the plurality of aggregation levels corresponding to a downlink control channel, perform candidate filtering-based blind decoding on one or more control channel candidates corresponding to the plurality of aggregation levels according to the decoding priority to obtain a decoding result, and receive downlink control information based on the decoding result.

According to an aspect of the inventive concepts, there is provided a communication system including a base station, and a first terminal connected to the base station, the base station being configured to transmit a first downlink control channel to the first terminal, and the first terminal being configured to perform first candidate filtering-based blind decoding on a plurality of first control channel candidates corresponding to a plurality of aggregation levels based on a first priority, the plurality of aggregation levels corresponding to the first downlink control channel, and receive first downlink control information.

BRIEF DESCRIPTION OF THE DRAWINGS

Embodiments of the inventive concepts will be more clearly understood from the following detailed description taken in conjunction with the accompanying drawings in which:

FIGS. 16A and 16B are detailed flowcharts illustrating embodiments of FIG. 15;

DETAILED DESCRIPTION

Hereinafter, embodiments of the inventive concepts will be described in detail with reference to the accompanying drawings.

Figure 1:
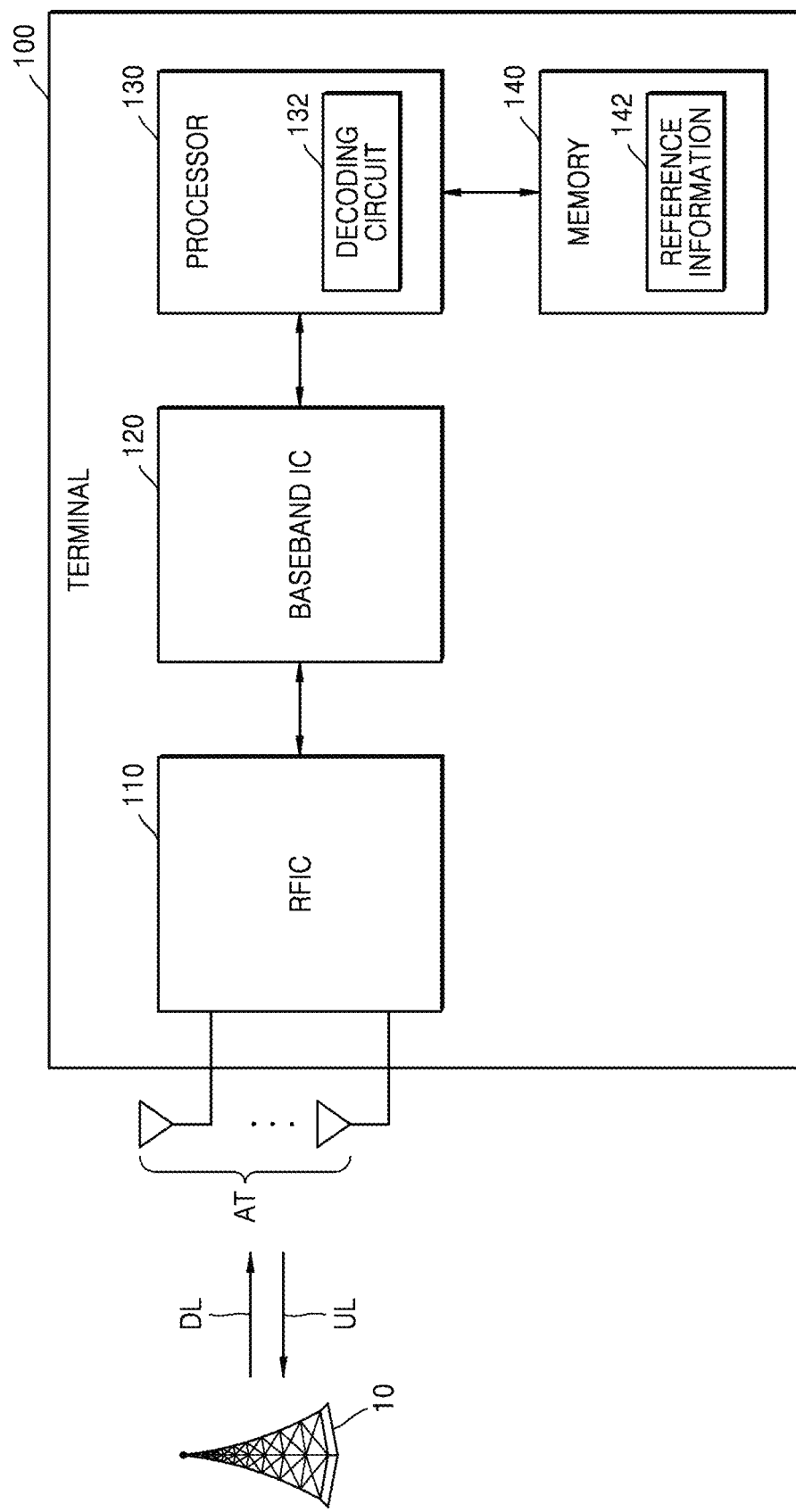
FIG. 1 is a block diagram illustrating a communication system according to embodiments of the inventive concepts.

FIG. 1 is a block diagram illustrating a communication system 1 according to embodiments of the inventive concepts. The communication system 1, as a non-limiting example, may be a New Radio (NR) system, a 5th Generation (5G) system, a Long Term Evolution (LTE) system, a Code Division Multiple Access (CDMA) system, a Global System for Mobile Communications (GSM) system, a Wireless Local Area Network (WLAN) system, and/or any other wireless communication system. Hereinafter, the communication system 1 may be described as the NR system, the LTE system or a system capable of supporting NR and LTE-based communication, but it will be understood that the inventive concepts are not limited thereto.

Referring to FIG. 1, the communication system 1 may include a base station 10 and a terminal 100. The terminal 100, as a wireless communication device, may have mobility, and may transmit, and receive, data and control information by communicating with the base station 10 through a downlink channel DL and an uplink channel UL. The terminal 100 may be referred to as, for example, user equipment (UE), a mobile station (MS), a mobile terminal (MT), a user terminal, a subscriber station (SS), a wireless device, a handheld device and/or the like.

The base station 10 may refer to a fixed station communicating with the terminal 100 and/or other base stations. The base station 10 may be referred to as, for example, a cell, a node B, an evolved-node B (eNB), a sector, a site, a base transceiver system (BTS), an access pint (AP), a relay node, a remote radio head (RRH), radio unit (RU), and/or the like.

Scheduling information of data (or downlink data) transmitted through the downlink channel DL or data (or uplink data) transmitted through the uplink channel UL may be included in downlink control information (hereinafter referred to as DCI) and transmitted from the base station 10 to the terminal 100. The DCI may be defined in various formats and operate by applying a DCI format determined according to whether it is scheduling information of uplink data or scheduling information of downlink data, whether it is a compact DCI with a small size of control information, and whether to apply spatial multiplexing using multiple antennas, whether it is a DCI for power control, etc.

The DCI may be transmitted from the base station 10 to the terminal 100 through a physical downlink control channel (hereinafter referred to as PDCCH) or an enhanced PDCCH (EPDCCH) via a channel coding and modulation process. For convenience of description, in FIG. 1, it is described in embodiments of the inventive concepts that the DCI is the PDCCH, but it will be fully understood that the DCI may be applied to the EPDCCH. A cyclic redundancy check (CRC) may be added to a payload of the DCI (or a DCI message), and may be scrambling with a radio network temporary identifier (RNTI) corresponding to the identity of the terminal 100. The terminal 100 may receive the DCI transmitted on the PDCCH, determine the CRC using the allocated RNTI, and when it is determined that the CRC is good (e.g., upon successful verification of the CRC), may be known that the DCI is transmitted to the terminal 100.

The terminal 100 may include a plurality of antennas AT, a radio frequency (RF) integrated circuit (IC) 110, a baseband IC 120, a processor 130, and/or a memory 140. Meanwhile, the implementation example of the terminal 100 shown in FIG. 1 is merely an example, and embodiments are not limited thereto, and the terminal 100 may include more or fewer configurations (e.g., components). In addition, in embodiments, the RFIC 110 and the baseband IC 120 may be included in one integrated circuit.

The RFIC 110 may perform a function of transmitting and receiving a signal using the plurality of antennas AT through a wireless channel such as band conversion and amplification of the signal. Specifically, the RFIC 110 may up-convert a baseband signal provided from the baseband IC 120 into an RF band signal, then transmit the RF band signal through the antennas AT, and down-convert the RF band signal received through the antennas AT into the baseband signal. For example, the RFIC 110 may include a transmission filter, a reception filter, an amplifier, a mixer, an oscillator, a digital to analog converter (DAC), an analog to digital converter (ADC), etc. In addition, the RFIC 110 may further include a plurality of RF chains (not shown), and may perform beamforming using the antennas AT. The RFIC 110 may adjust the phase and size of each of signals transmitted and received through the antennas AT for beamforming. Further, the RFIC 110 may perform a multi input multi output (MIMO) operation and, when performing the MIMO operation, receive multiple layers.

The baseband IC 120 may perform a conversion operation between the baseband signal and a bit string according to a physical layer standard of the system. For example, the baseband IC 120 may generate complex symbols by encoding and modulating a transmission bit stream during data transmission. In addition, the baseband IC 120 may demodulate and decode the baseband signal provided from the RFIC 110 when receiving data to restore a reception bit stream.

The RFIC 110 and the baseband IC 120 may transmit and receive signals as described above. The RFIC 110 and the baseband IC 120 may be referred to as a transmitter, a receiver, a transceiver, or a communicator. Furthermore, at least one of the RFIC 110 and the baseband IC 120 may include a plurality of communication modules for supporting a plurality of different wireless access technologies. In addition, at least one of the RFIC 110 and the baseband IC 120 may include different communication modules to process signals of different frequency bands. For example, different wireless access technologies may include new radio (NR) technology, LTE technology, etc. In addition, different frequency bands may include a super high frequency band, a millimeter wave band, etc. The terminal 100 may communicate with the base station 10 using the RFIC 110 and the baseband IC 120.

The memory 140 may store data such as a basic program, an application program, and/or setting information for the operation of the terminal 100. Also, the memory 140 may store a program, in the form of a code, executed when the processor 130 performs candidate filtering-based blind decoding according to embodiments of the inventive concepts. In embodiments, the memory 140 may store reference information 142 referenced for candidate filtering-based blind decoding.

The processor 130 may control overall operations of the terminal 100. In embodiments, the processor 130 may include a decoding circuit 132 that performs candidate filtering-based blind decoding to detect the PDCCH without knowing information about the PDCCH transmitted from the base station 10. In general, the search space representing a set of control-channel elements (CCEs) may be defined for blind decoding. The search space includes sets of a plurality of CCEs according to an aggregation level, and the aggregation level is not explicitly signaled and may be implicitly defined through a function and subframe number based on the identity of a terminal. Blind decoding may be performed on all possible control channel candidates (or resource candidates) that may be created from the CCEs in the search space set in each subframe, and DCI transmitted through the PDCCH may be received through determination of the CRC. Hereinafter, for convenience of description, control channel candidates may also be referred to as candidates.

In embodiments, the decoding circuit 132 may determine a decoding priority with respect to aggregation levels based on the reference information 142 read from the memory 140. The decoding circuit 132 may prioritize an aggregation level having a high availability for transmitting the PDCCH, and may determine a decoding priority so that candidate filtering-based blind decoding may be performed. Meanwhile, the decoding circuit 132 may perform candidate filtering-based blind decoding on the PDCCH for each transmission time interval (TTI). The aggregation levels may each include control channel candidates including a defined number of CCEs. The decoding circuit 132 may perform candidate filtering-based blind decoding in a certain order with respect to the aggregation levels according to the decoding priority. In embodiments, the decoding circuit 132 may be implemented as software logic, hardware logic, or mixed software/hardware logic. The operation of the decoding circuit 132 to be described below may also be defined as an operation of the processor 130 or the terminal 100.

In embodiments, the reference information 142 may include history information indicating results of blind decoding that has been previously performed. For example, the history information may indicate the number of control channel candidates that are determined that the CRC is good (e.g., the number of control channel candidates for which a respective CRC has been successfully verified) for each aggregation level in a blind decoding history of at least one previous TTI. The decoding circuit 132 may determine decoding priorities with respect to the aggregation levels in the order of the highest number of control channel candidates that are determined that the CRC is good (e.g., correspond to a successfully verified CRC).

In embodiments, the reference information 142 may include history information indicating a trend of a format used by the base station 10 (e.g., one or more formats previously used by the base station 10, or a frequency or rate of use of the one or more formats,) to transmit the PDCCH. As an example, the history information may indicate a frequency for each aggregation level used when the base station 10 transmits the PDCCH to the terminal 100 for a certain period (e.g., a frequency or rate at which the base station 10 has transmitted the PDCCH on each different aggregation level to the terminal 100 for the certain period). The decoding circuit 132 may determine the decoding priority of the aggregation levels in the order of the highest frequency.

In embodiments, the reference information 142 may include state information indicating a state of the downlink channel DL. As an example, the state information may include results of measurement of at least one indicator indicating the state of the downlink channel DL. For example, the state information may include results of measurement of at least one indicator of Reference Signals Received Power (RSRP), Reference Signal Received Quality (RSRQ), Signal to Interference plus Noise Ration (SINR), Received Signal Code Power (RSCP), and/or received energy from pilot signal to noise (EcN0). The base station 10 may receive the state of the downlink channel DL from the terminal 100, and the base station 10 may select an aggregation level for transmission of the PDCCH in consideration of the state of the downlink channel DL. Meanwhile, the base station 10 may transmit the PDCCH by selecting a relatively low aggregation level when the state of the downlink channel DL is good and by selecting a relatively high aggregation level when the state of the downlink channel DL is bad. The decoding circuit 132 may determine the decoding priority with respect to the aggregation levels based on the state of the downlink channel DL in consideration of a PDCCH transmission method of the base station 10 as described above.

In embodiments, the reference information 142 may include information processed from the above-described history information and/or state information. Furthermore, the reference information 142 may include various pieces of information that may be referenced for the decoding circuit 132 to determine the decoding priority with respect to the aggregation levels.

In embodiments, the decoding circuit 132 may perform candidate filtering-based blind decoding with respect to control channel candidates corresponding to each of the aggregation levels according to decoding priority. As an example, the decoding circuit 132 may exclude at least one control channel candidate that is determined that the CRC is good among the control channel candidates and overlapping with a control channel candidate of which reliability exceeds a first threshold from candidate filtering-based blind decoding. That is, the decoding circuit 132 may filter control channel candidates by removing at least one control channel candidate including at least one CCE overlapping with a control channel candidate satisfying a certain condition while performing blind decoding, and perform blind decoding on the control channel candidates. Hereinafter, a blind decoding operation of the terminal 100 to be described may mean a candidate filtering-based blind decoding operation.

In embodiments, the decoding circuit 132 may exclude only control channel candidates corresponding to some aggregation levels among overlapping control channel candidates from blind decoding. For example, the decoding circuit 132 may select a candidate-excluded aggregation level direction based on a network state of the terminal 100, and exclude control channel candidates corresponding to some aggregation levels from among all overlapping control channel candidates based on the selected direction from blind decoding.

In embodiments, the decoding circuit 132 may perform first blind decoding to receive the PDCCH using results of decoding of a control channel candidate that is determined that the CRC is good and has a reliability exceeding a second threshold. However, when the decoding circuit 132 fails to receive the PDCCH through the control channel candidate according to the network state between the base station 10 and the terminal 100, or, when there is no control channel candidate that is determined that the CRC is good, and has a reliability exceeding the second threshold, the decoding circuit 132 may perform second blind decoding on the at least one control channel candidate excluded from first blind decoding.

In embodiments, the decoding circuit 132 may manage the first threshold used to determine the decoding priority and the second threshold used to determine the control channel candidate used for reception of the PDCCH in the same manner or differently. For example, the first threshold may be set larger than the second threshold so that the criterion for excluding other control channel candidates from blind decoding may be strict, and the first threshold may be set smaller than the second threshold so that the number of control channel candidates on which blind decoding is performed may be simplified. In embodiments, the first threshold may be variably set according to the network state of the terminal 100, and accordingly, the first threshold may be dynamically larger or smaller than the second threshold.

In embodiments, the decoding circuit 132 may periodically or aperiodically collect the decoding history information to generate the reference information 142 and store or update the reference information 142 in the memory 140. In addition, in embodiments, the decoding circuit 132 may periodically or aperiodically measure the state of the downlink channel DL to generate the reference information 142 and store or update the reference information 142 in the memory 140.

The terminal 100 according to embodiments of the inventive concepts may selectively perform blind decoding with respect to an aggregation level with a high availability for transmitting the PDCCH, and exclude the overlapping control channel candidates from blind decoding, thereby optimizing or reducing the time and power consumed for blind decoding, and as a result, there is an effect of improving the communication performance of the terminal 100.

Figure 2:
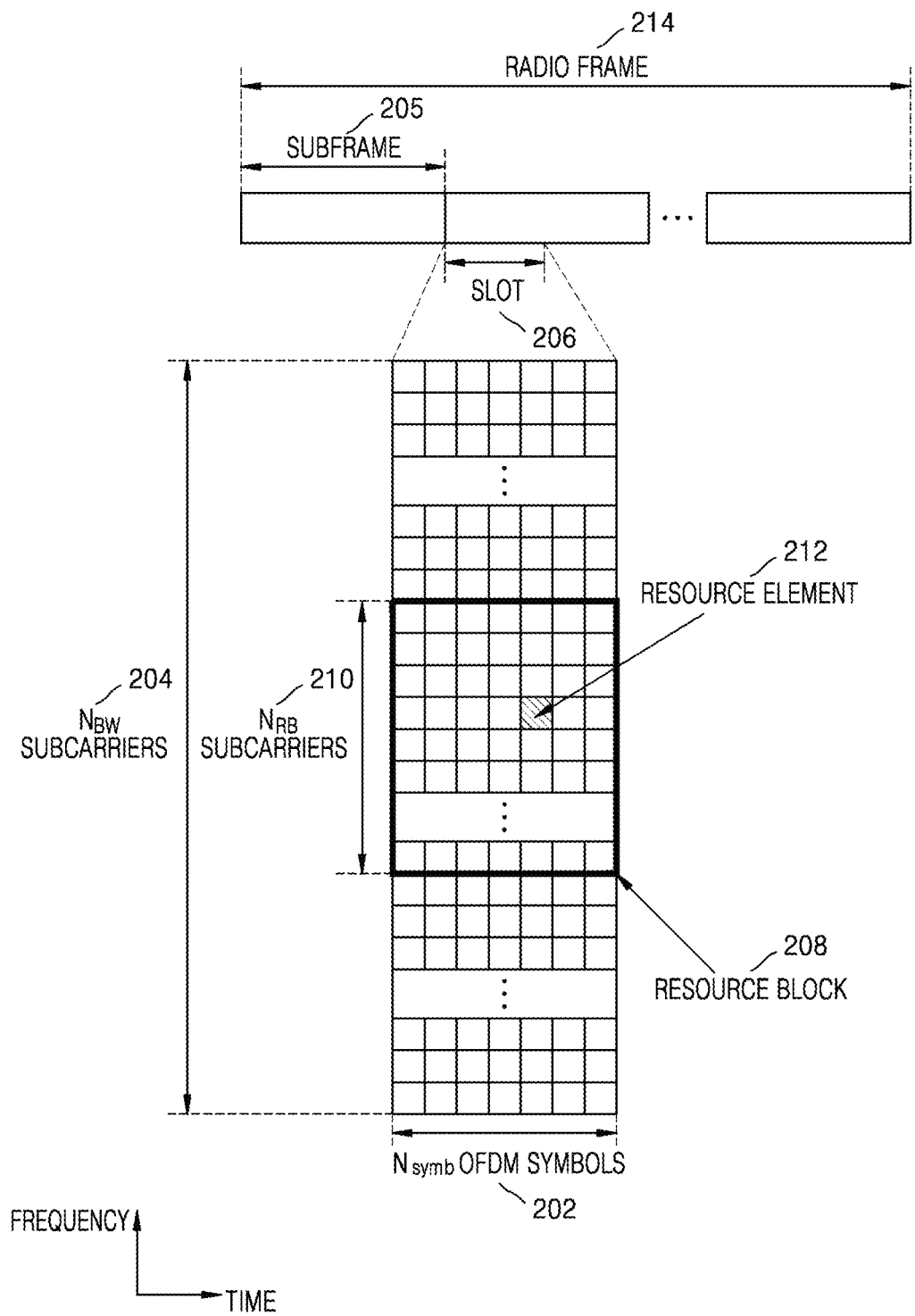
FIG. 2 is a diagram illustrating a basic structure of a time-frequency domain in the communication system of FIG. 1.

FIG. 2 is a diagram illustrating a basic structure of a time-frequency domain in the communication system 1 of FIG. 1.

Referring to FIG. 2, the horizontal axis represents a time domain, and the vertical axis represents a frequency domain. The minimum or smallest transmission unit in the time domain is an Orthogonal Frequency Division Multiplexing (OFDM) symbol, $N_{symb}$ 202 OFDM symbols may constitute one slot 206, and two slots may constitute one subframe 205. For example, the length of the slot 206 may be 0.5 ms, and the length of the subframe may be 1.0 ms. In addition, a radio frame 214 may be a time domain unit including 10 subframes 205. The subframe 205 may correspond to one TTI.

The minimum or smallest transmission unit in a frequency domain is a subcarrier, and the bandwidth of an entire system transmission bandwidth may include the total of $N_{BW}$ 204 subcarriers. In the time-frequency domain, a basic unit of a resource is a resource element (RE) 212 and may be represented by an OFDM symbol index and a subcarrier index. A resource block (RB) 208 may be defined as the $N_{symb}$ 202 consecutive OFDM symbols in the time domain and the $N_{RB}$ 210 consecutive subcarriers in the frequency domain. Accordingly, one RB 208 may include ($N_{symb}*N_{RB}$) REs 212. An RB pair is a unit that connects two RBs on a time axis and may include ($N_{symb}*2N_{RB}$) REs 212. Meanwhile, a PDCCH may be transmitted from a base station to a terminal in a communication system through resources in the time-frequency domain as shown in FIG. 2, and DCI may be transmitted through the PDCCH. The DCI may include information about downlink scheduling assignment including physical downlink shared channel (PDSCH) resource designation, a transmission format, HARQ information, and/or spatial multiplexing-related control information.

Figure 3:
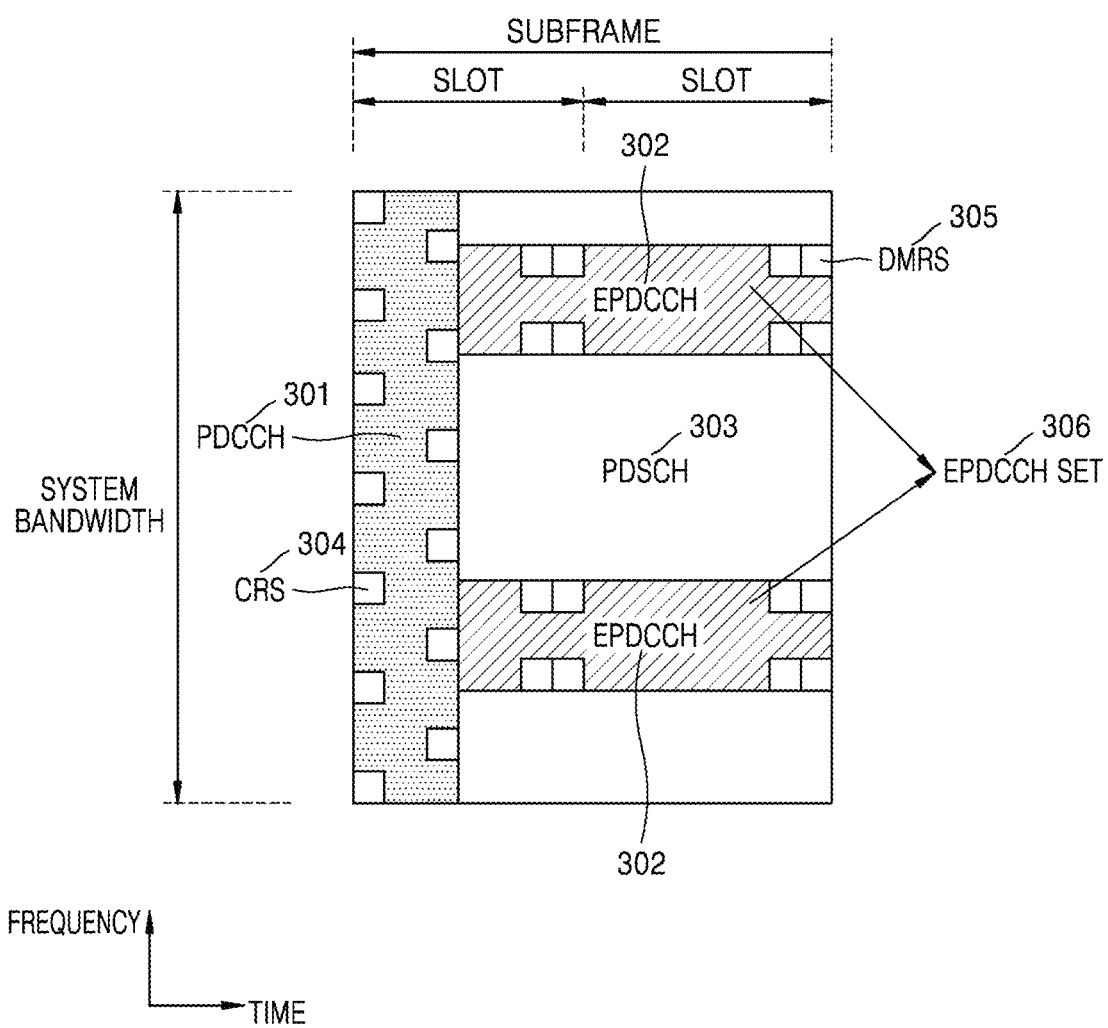
FIG. 3 is a diagram illustrating a physical downlink control channel (PDCCH) and an enhanced PDCCH (EPDCCH) in a communication system supporting long term evolution (LTE)

FIG. 3 is a diagram illustrating a PDCCH 301 and an EPDCCH 302 in a communication system supporting LTE.

Referring to FIG. 3, the PDCCH 301 may be time multiplexed with a PDSCH 303 which is a data transmission channel and may be transmitted over the entire system bandwidth. The PDCCH 301 may be expressed in the number of OFDM symbols, which may be indicated to the terminal through a control format indicator (CFI) transmitted through a physical control format indicator channel (PCFICH). The PDCCH 201 may be assigned to an OFDM symbol in the beginning of a subframe, and thus the terminal may decode the downlink scheduling assignment quickly. One PDCCH may carry one DCI, and a plurality of terminals may be simultaneously or contemporaneously scheduled in downlink and uplink, and thus a plurality of PDCCHs may be simultaneously or contemporaneously transmitted within each terminal.

A cell-specific reference signal (CRS) 304 is used as a reference signal for decoding the PDCCH 301. The CRS 304 may be transmitted every subframe over the entire band, and scrambling and resource mapping may vary according to the identity (ID) of a base station (or a cell). Because the CRS 304 is a reference signal commonly used by all terminals, terminal-specific beamforming may not be used. Therefore, a multi-antenna transmission method with respect to the PDCCH of LTE is limited to open-loop transmission diversity. The number of ports of the CRS 304 may be implicitly known to the terminal from decoding of a physical broadcast channel (PBCH).

Resource allocation of the PDCCH 301 is based on a CCE, and one CCE includes 9 resource element groups (REGs), that is, the total of 36 REs. The number of CCEs used for the specific PDCCH 301 may be 1, 2, 4, or 8, which varies depending on a channel coding rate of a payload of the DCI. As described above, different numbers of CCEs may be used to implement link adaptation of the PDCCH 301.

The terminal should detect a signal without knowing information about the PDCCH 301, and search spaces representing a set of CCEs have been defined for blind decoding. Search space are classified into a terminal-specific search space and a common search space. A certain group of UEs or all UEs may examine the common search space of the PDCCH 301 in order to receive control information common to a base station such as a dynamic scheduling or paging message with respect to system information. For example, scheduling allocation information of a DL-SCH for transmission of a system information block (SIB)-1 including operator information of the base station, etc. may be received by examining the common search space of the PDCCH 301. In addition, the terminal-specific DCI, such as scheduling information about uplink data and/or scheduling information about downlink data, is transmitted through a mode terminal-specific search space.

Meanwhile, the EPDCCH 302 may be transmitted after being frequency multiplexed with the PDSCH 303. The base station may appropriately allocate resources of the EPDCCH 302 and the PDSCH 303 through scheduling, thereby effectively supporting coexistence with data transmission for the terminal.

The plurality of EPDCCHs 302 constitute one EPDCCH set 306, and are allocated in units of a physical resource block (PRB) pair. Location information about the EPDCCH set 306 is set terminal-specifically, which may be signaled through remote radio control (RRC). Two EPDCCH sets 306 to the maximum (e.g., highest number) may be set for each terminal, and one EPDCCH set 306 may be multiplexed to different terminals and set at the same time or contemporaneously.

In the EPDCCH 302, a demodulation reference signal (DMRS) 305 is used as an RS for decoding. The DMRS 305 of the EPDCCH 302 uses the same pattern as, or a similar pattern o, the PDSCH 303. However, unlike the PDSCH 303, the DMRS 305 in the EPDCCH 302 may support four antenna ports to the maximum (e.g., highest number). The DMRS 305 of the EPDCCH 302 may be transmitted only in the corresponding PRB through which the EPDCCH 302 is transmitted.

A blind decoding operation according to embodiments of the inventive concepts may be applied to both the PDCCH and the EPDCCH described with reference to FIG. 3. In addition, further, in a communication system supporting LTE, the blind decoding operation according to embodiments of the inventive concepts may be applied to all of the Machine Type Communication PDCCH (MPDCCH), Short TTI PDCCH (SPDCCH), and/or NB-IOT PDCCH (NPDCCH).

Figure 4:
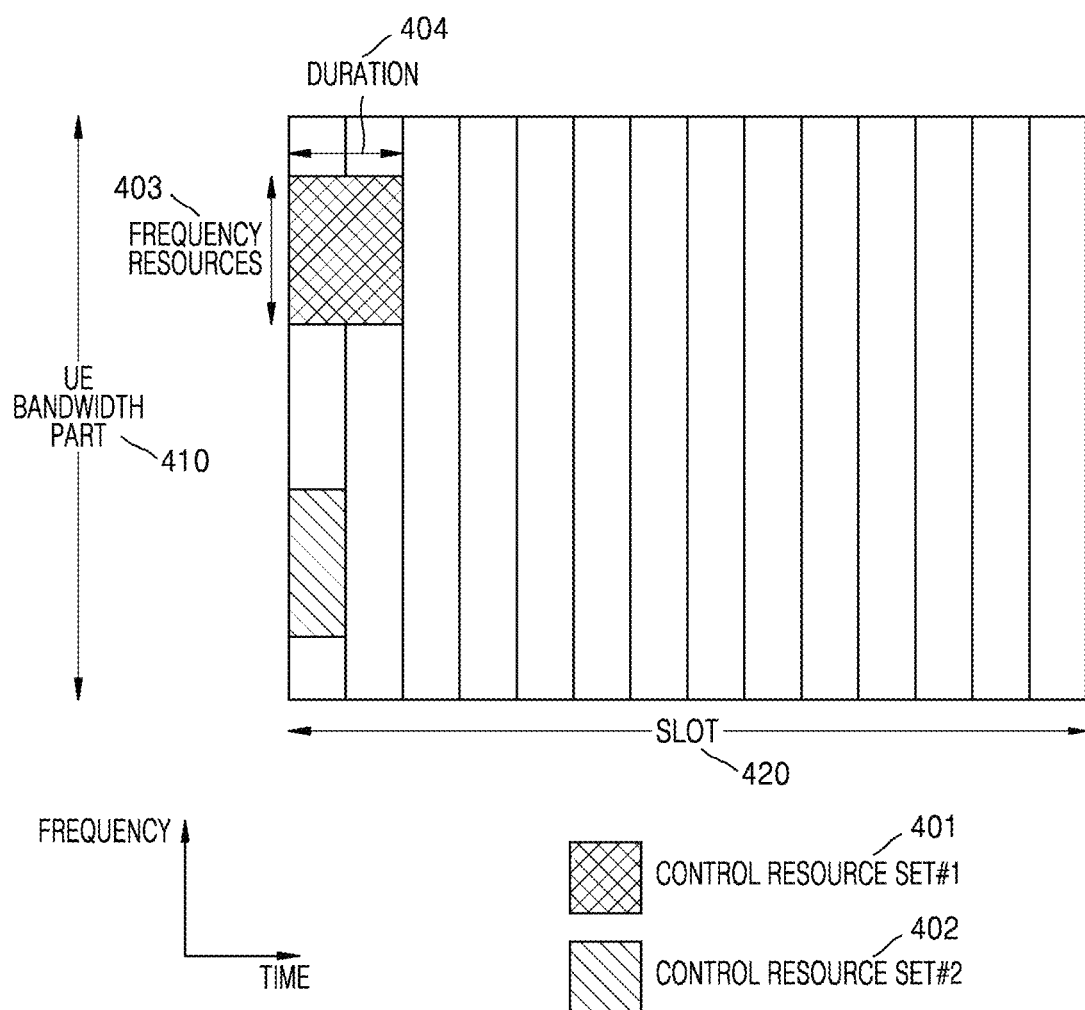
FIG. 4 is a diagram illustrating an example of a control resource set in which a PDCCH is transmitted in a communication system supporting new radio (NR)

FIG. 4 is a diagram illustrating an example of a control resource set CORESET in which a PDCCH is transmitted in a communication system supporting NR.

FIG. 4 shows the example in which a UE bandwidth part 410 is set in a frequency axis and two control resource set CORESET (control resource set #1 401 and control resource set #2 402) are set within a 1 slot 420 in a time axis. The control resource set #1 401 and the control resource set #2 402 may be set in specific frequency resources 403 within the entire UE bandwidth part 410 in the frequency axis. The control resource set #1 401 and the control resource set #2 402 may be set to one or a plurality of OFDM symbols in the time axis, which may be defined as a control resource set duration 404. Referring to the example of FIG. 4, the control resource set #1 401 may be set to a control resource set duration corresponding to two symbols, and the control resource set #2 402 may be set to a control resource set duration corresponding to one symbol.

A control resource set in the NR may be set by a base station to a UE through higher layer signaling (e.g., system information, master information block (MIB), and RRC signaling). Setting the control resource set to the UE may mean providing information such as a control resource set identifier (Identity), a frequency position of the control resource set, and a symbol duration of the control resource set.

Figure 5:
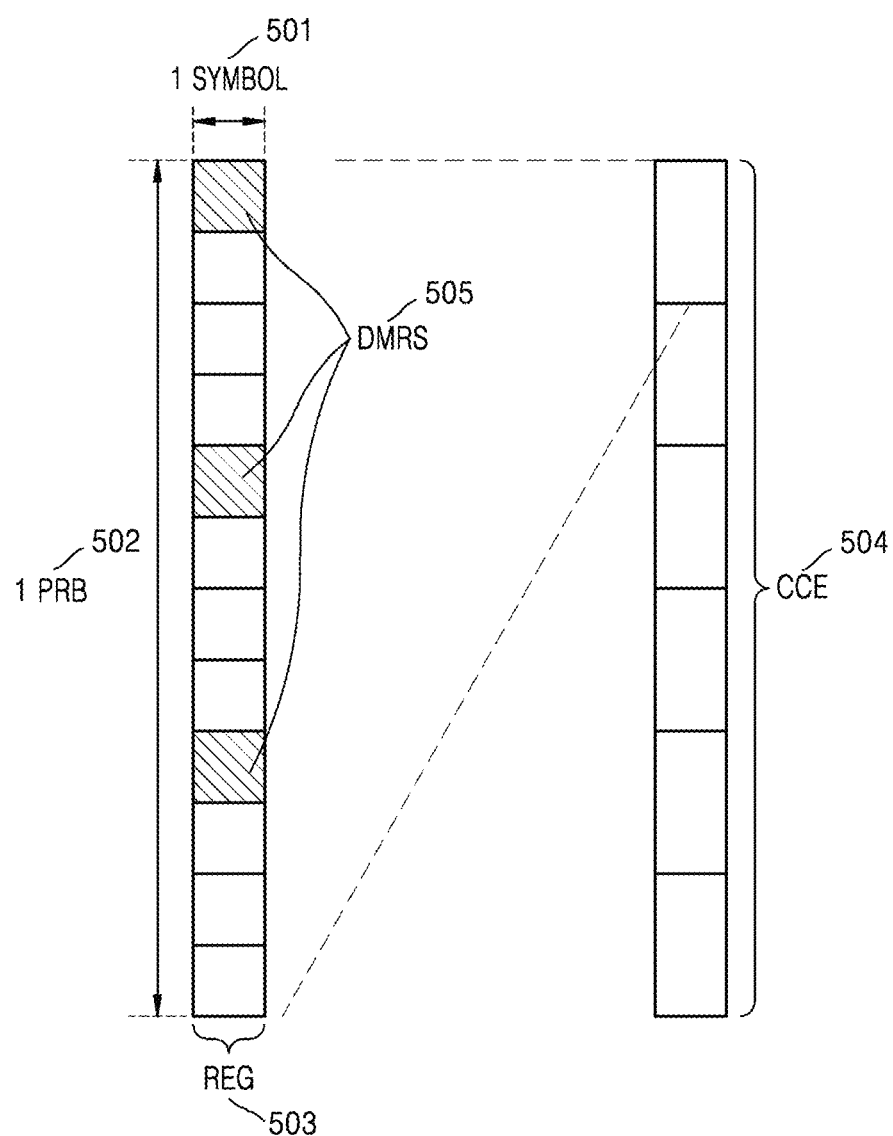
FIG. 5 is a diagram illustrating an example of a basic unit of time and frequency resources constituting a PDCCH in a communication system supporting NR.

FIG. 5 is a diagram illustrating an example of a basic unit of time and frequency resources constituting a PDCCH in a communication system supporting NR.

Referring to FIG. 5, the basic unit of time and frequency resources constituting the PDCCH may be referred to as an REG 503. The REG 503 may be defined as a 1 OFDM symbol 501 in a time axis and a 1 physical resource block (PRB) 502, that is, 12 subcarriers, in a frequency axis. A base station may configure a PDCCH allocation unit by concatenating the REG 503.

As shown in FIG. 5, when the basic unit to which the PDCCH is allocated in the NR is a CCE 504, a 1 CCE 504 may include a plurality of REGs 503. For example, the REG 503 shown in FIG. 5 may include 12 REs, and when the 1 CCE 504 includes 6 REGs 503, the 1 CCE 504 may include 72 REs. When a downlink control region is set, the corresponding region may include a plurality of CCEs 504, and a specific PDCCH may be mapped to one or a plurality of CCEs 504 according to an aggregation level in the control region and then transmitted. The CCEs 504 in the control region are classified by numbers, and in this regard, the numbers of the CCEs 504 may be assigned according to a logical mapping method.

The basic unit of the PDCCH shown in FIG. 5, that is, the REG 503, may include both REs to which DCI is mapped and a region to which a DMRS 505 which is a reference signal for decoding the REs is mapped. As shown in FIG. 5, three DMRSs 505 may be transmitted in the 1 REG 503. The number of CCEs used to transmit the PDCCH may be 1, 2, 4, 8, or 16 depending on the aggregation level, and different numbers of CCEs may be used to implement link adaptation of the PDCCH. For example, when the aggregation level is 'L', one PDCCH may be transmitted through 'L' CCEs.

A parameter of a search space with respect to the PDCCH may be set from a base station to a terminal by higher layer signaling (e.g., SIB, MIB, or RRC signaling). For example, the base station may set, to the terminal, the number of control channel candidates for each aggregation level, a monitoring period with respect to the search space, a monitoring occasion in a symbol unit within a slot with respect to the search space, a search space type (a common search space or a terminal-specific search space), a combination of a DCI format to be monitored in the search space and RNTI, a control region index to be monitored in the search space, etc.

A blind decoding operation according to embodiments of the inventive concepts may be applied to both the PDCCH described in FIGS. 4 and 5.

Figure 6A:
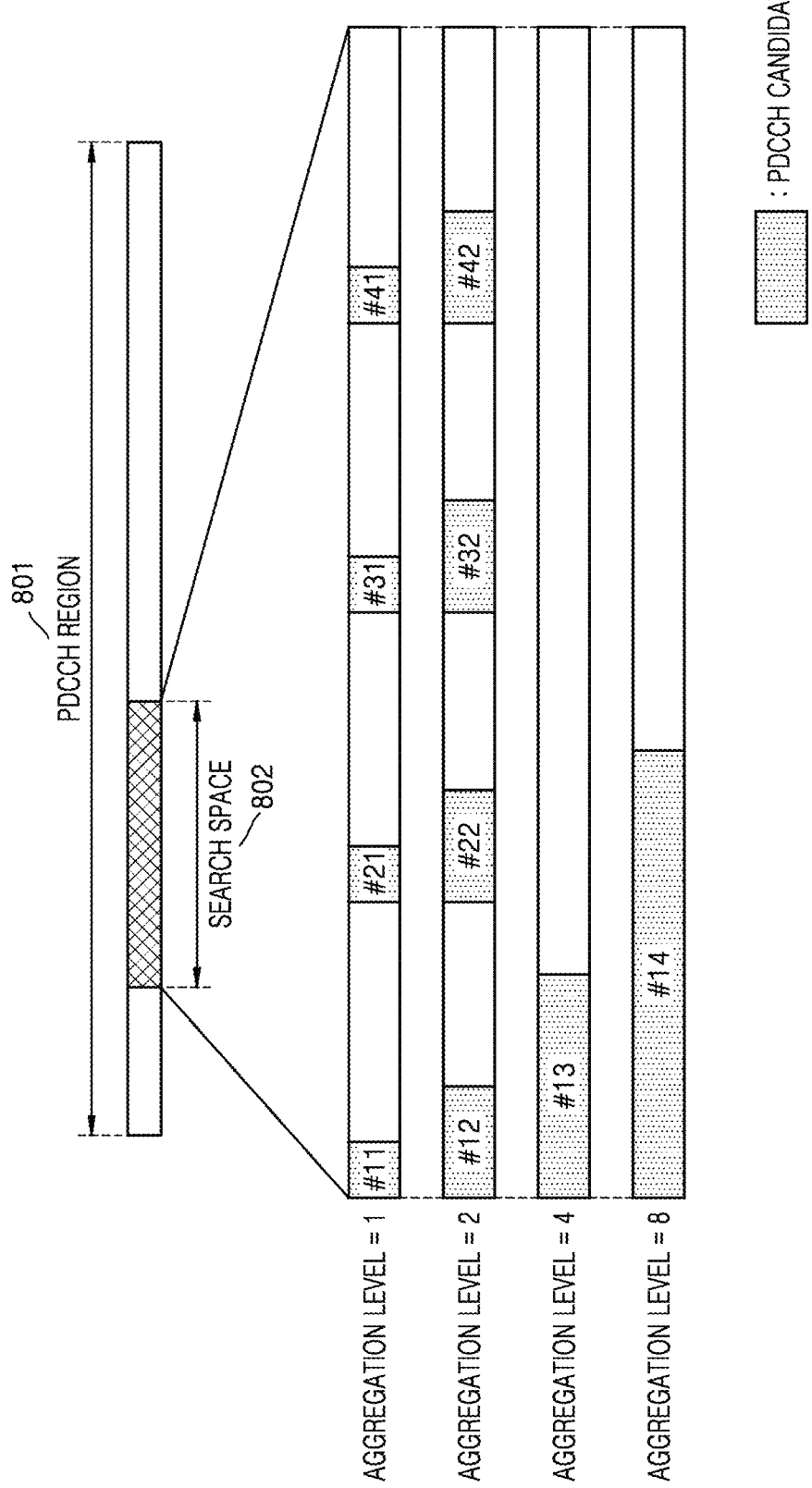
FIGS. 6A and 6B are diagrams illustrating an example of a search space of a PDCCH to which embodiments of the inventive concepts are applied.
Figure 6B:
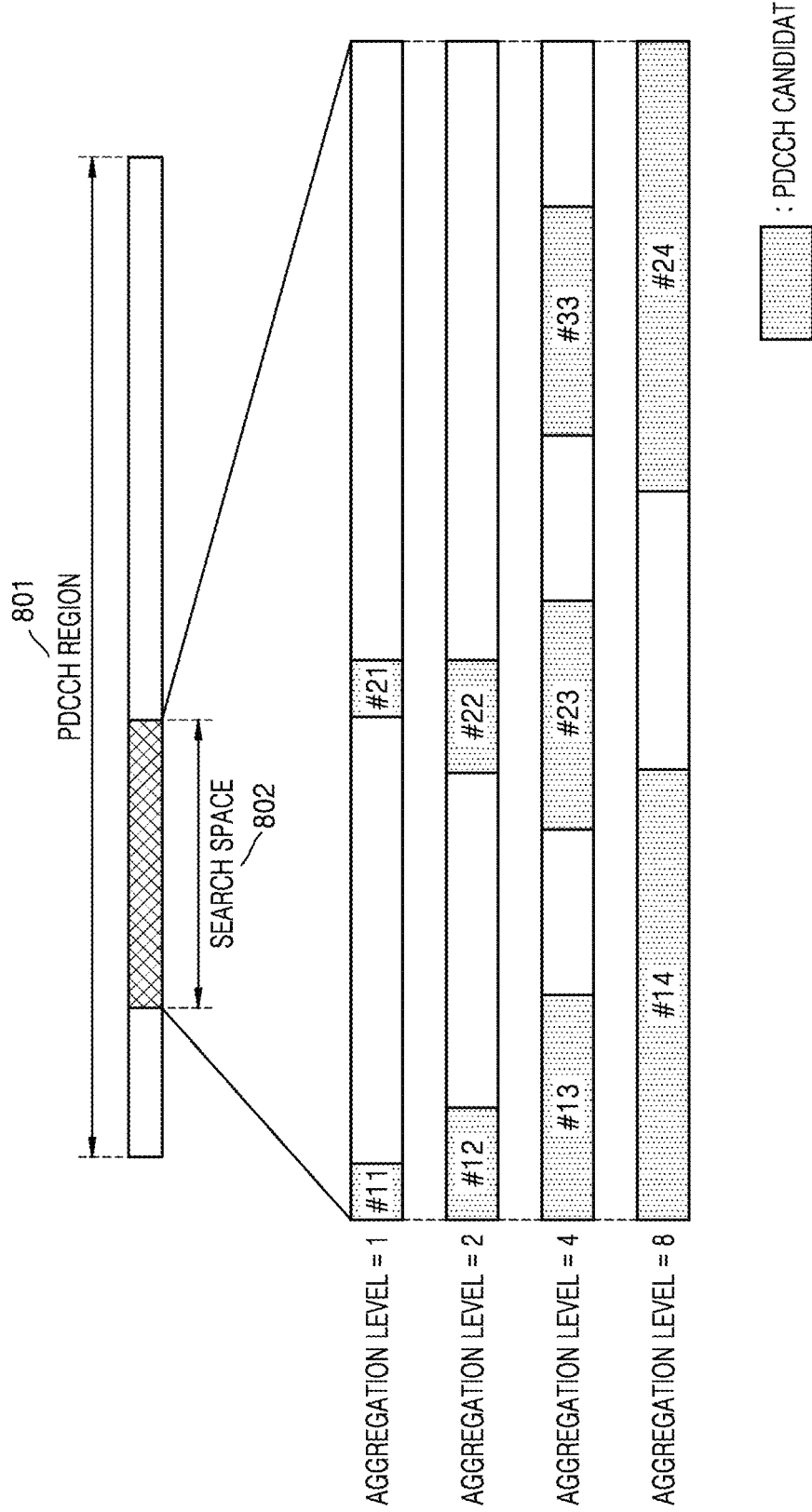

FIGS. 6A and 6B are diagrams illustrating an example of a search space 802 of a PDCCH to which embodiments of the inventive concepts are applied. However, embodiments illustrated in FIGS. 6A and 6B are merely examples for better understanding, and it is clear that the inventive concepts are not limited thereto.

Referring to FIG. 6A, a PDCCH region 801 may include CCEs, and the configuration of CCEs may be based on logical mapping. Actual physical mapping with respect to the PDCCH region 801 may be determined by time and frequency resources set to the PDCCH. The search space 802 may be a common search space or a terminal-specific search space.

In embodiments, an aggregation level '1' may include first to fourth candidates #11 to #41 each including one CCE, an aggregation level '2' may include fifth to eighth candidates #12 to #42 each including two CCEs, an aggregation level '4' may include a ninth candidate #13 including four CCEs, and an aggregation level '8' may include a tenth candidate #14 including eight CCEs in the search space 802.

A base station may transmit the PDCCH to a terminal through any one of the first to tenth candidates #11 to #41, #12 to #42, #13, and/or #14. As shown in FIG. 6A, for example, when a state of a downlink channel with the terminal is good, the base station may assign a greater number of candidates to the low aggregation levels '1' and '2' than the high aggregation levels '4' and '8'.

Referring further to FIG. 6B, the aggregation level '1' may include the first and second candidates #11 and #21 including one CCE, the aggregation level '2' may include the third and fourth candidates #12 and #22 including two CCEs, the aggregation level '4' may include the fifth to seventh candidates #13 to #33 including four CCEs, and the aggregation level '8' may include the eighth and ninth candidates #14 and #15 including eight CCEs in the search space 802. The base station may transmit the PDCCH to the terminal through any one of the first to ninth candidates #11, #21, #12, #22, #13 to #33, #14, and #15. As shown in FIG. 6B, for example, when the state of the downlink channel with the terminal is not good, the base station may allocate a greater number of candidates to the high aggregation levels '4' and '8' than the low aggregation levels '1' and '2'.

The terminal according to embodiments of the inventive concepts may determine a decoding priority with respect to aggregation levels in the search region 802 and perform candidate filtering-based blind decoding based on the decoding priority. Embodiments in this regard will be described later.

Figure 7:
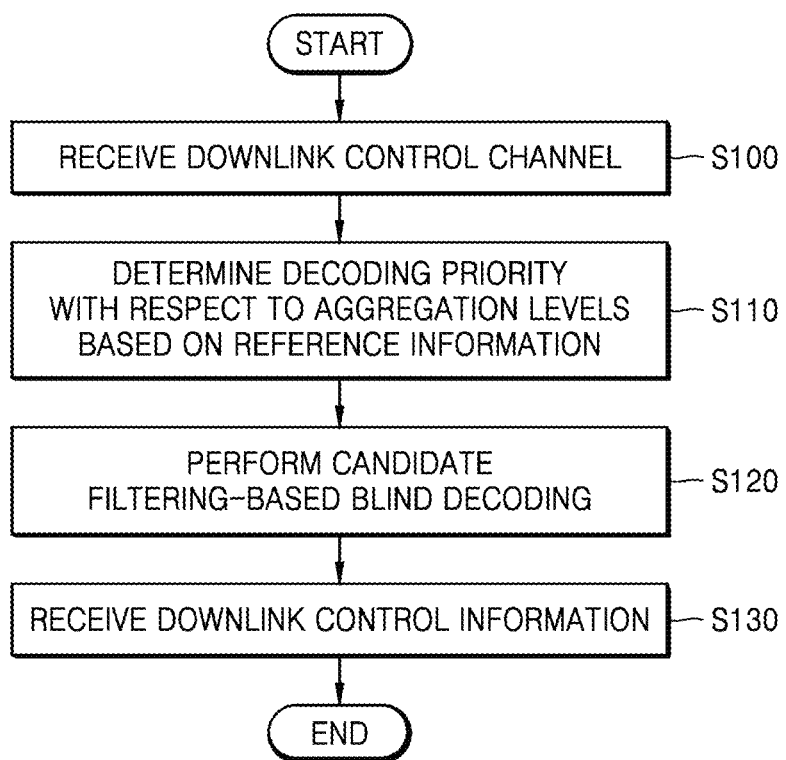
FIG. 7 is a flowchart illustrating an operating method of a terminal according to embodiments of the inventive concepts.

FIG. 7 is a flowchart illustrating an operating method of a terminal according to embodiments of the inventive concepts.

Referring to FIG. 7, in operation S100, the terminal may receive a PDCCH from a base station. In operation S110, the terminal may determine a decoding priority with respect to aggregation levels based on reference information. In operation S120, the terminal may perform candidate filtering-based blind decoding on control channel candidates included in each of the aggregation levels based on the determined decoding priority. In operation S130, the terminal may receive DCI using results of decoding. According to embodiments, the terminal may generate a signal (e.g., a communication signal) based on the DCI, and/or may transmit the signal to the base station based on the DCI.

Figure 8A:
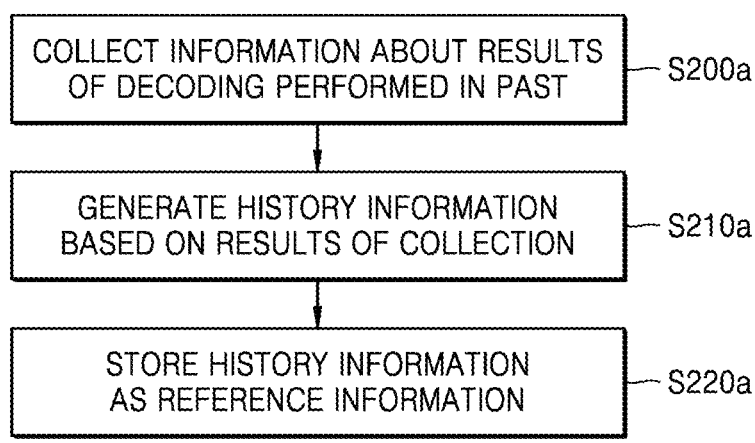
FIGS. 8A and 8B are flowcharts illustrating a method of generating and storing reference information of a terminal according to embodiments of the inventive concepts.
Figure 8B:
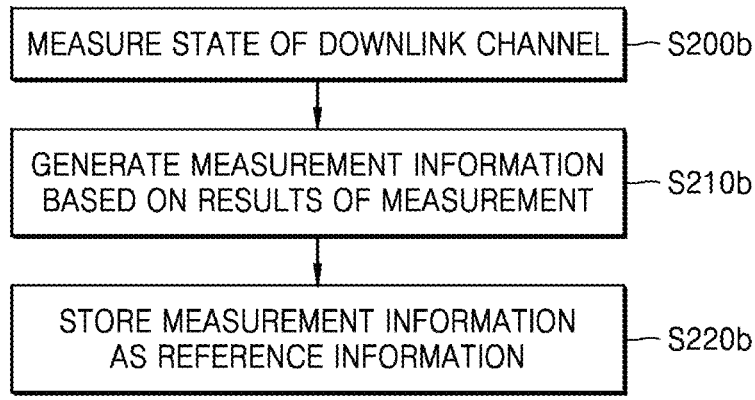

FIGS. 8A and 8B are flowcharts illustrating a method of generating and storing reference information of a terminal according to embodiments of the inventive concepts.

Referring to FIG. 8A, in operation S200a, the terminal may collect information about results of decoding performed in the past. The results of decoding performed in the past may indicate the number of control channel candidates that are determined that the CRC is good for each aggregation level for a certain period (e.g., a plurality of TTIs). In addition, the results of decoding performed in the past may indicate the frequency for each aggregation level used by the base station when transmitting the PDCCH. In addition to this, the terminal may additionally collect results of decoding suitable for determining decoding priority with respect to aggregation levels.

In operation S210a, the terminal may generate history information based on the collected results. In operation S220a, the terminal may store the history information as reference information. In embodiments, the terminal may periodically or aperiodically repeat operations S200a and S210a to update the reference information.

Referring to FIG. 8B, in operation S200b, the terminal may measure a state of a downlink channel. For example, the terminal may determine the state of the downlink channel by measuring at least one indicator of RSRP, RSRQ, SINR, RSCP, and/or EcN0. In operation S210b, the terminal may generate measurement information based on results of the measurement. In operation S220b, the terminal may store the measurement information as reference information. In embodiments, the terminal may periodically or aperiodically repeat operations S200b and S210b to update the reference information.

Figure 9:
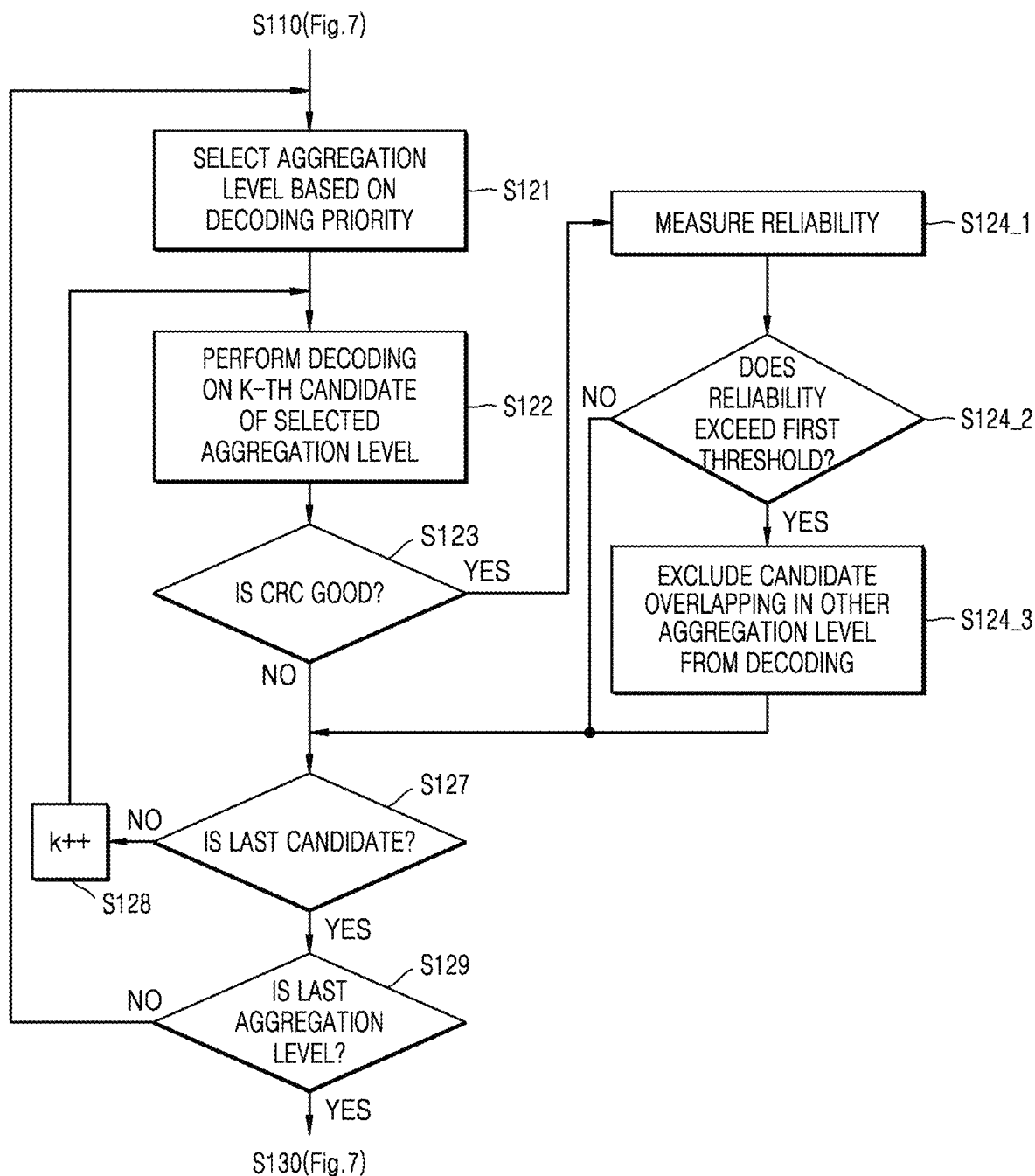
FIG. 9 is a detailed flowchart illustrating operation S120 of FIG. 7 according to embodiments of the inventive concepts.

FIG. 9 is a detailed flowchart illustrating operation S120 of FIG. 7 according to embodiments of the inventive concepts.

Referring to FIG. 9, in operation S121 following operation S110 (FIG. 7), a terminal may select an aggregation level based on a decoding priority. In operation S122, the terminal may perform decoding on a k-th candidate of the selected aggregation level (where k is an integer greater than or equal to 1 and starts from 1). In operation S123, the terminal may determine whether a CRC is good as a result of decoding the k-th candidate. When a result of operation S123 is 'YES', following operation S124_1, the terminal may measure the reliability of the k-th candidate. Measuring the reliability of a candidate may be interpreted as measuring the reliability of results of decoding of the candidate. As an example, the terminal may measure a symbol error rate (SER) as the reliability by comparing data before encoding with data included in the results of decoding of the candidate based on an effective decoding reliability metric and counting the number of errors. As another example, the terminal may measure, as the reliability, a correlation value between an input of a polar decoder in the terminal that decodes the candidate based on a soft-correlation metric and an encoded codeword received by the terminal. In addition to this, the terminal may measure various indicators indicating the reliability of the candidate.

In operation S124_2, the terminal may determine whether the reliability of the k-th candidate exceeds a first threshold. When a result of operation S124_2 is 'YES', following operation S124_3, the terminal may exclude a candidate overlapping (e.g., with respect to frequency and/or time) with the k-th candidate in least one aggregation level different from the selected aggregation level from decoding (e.g., skip, block, etc., decoding for the excluded candidate). When the result of operation S124_2 is 'NO', or following operation S127 after operation S124_3, the terminal may determine whether the k-th candidate is the last candidate of the selected aggregation level. Similarly, when the result of operation S123 is 'NO', or following operation S127 after operation S123, the terminal may determine whether the k-th candidate is the last candidate of the selected aggregation level. When a result of operation S127 is 'NO', following operation S128, the terminal may count up (e.g., increment) k and perform operation S122. When the result of operation S127 is 'YES', following operation S129, the terminal may determine whether the selected aggregation level is the last aggregation level. When a result of operation S129 is 'NO', following operation S121, the terminal may select a next aggregation level based on the decoding priority. When the result of operation S129 is 'YES', operation S130 (FIG. 7) may follow.

Figure 10:
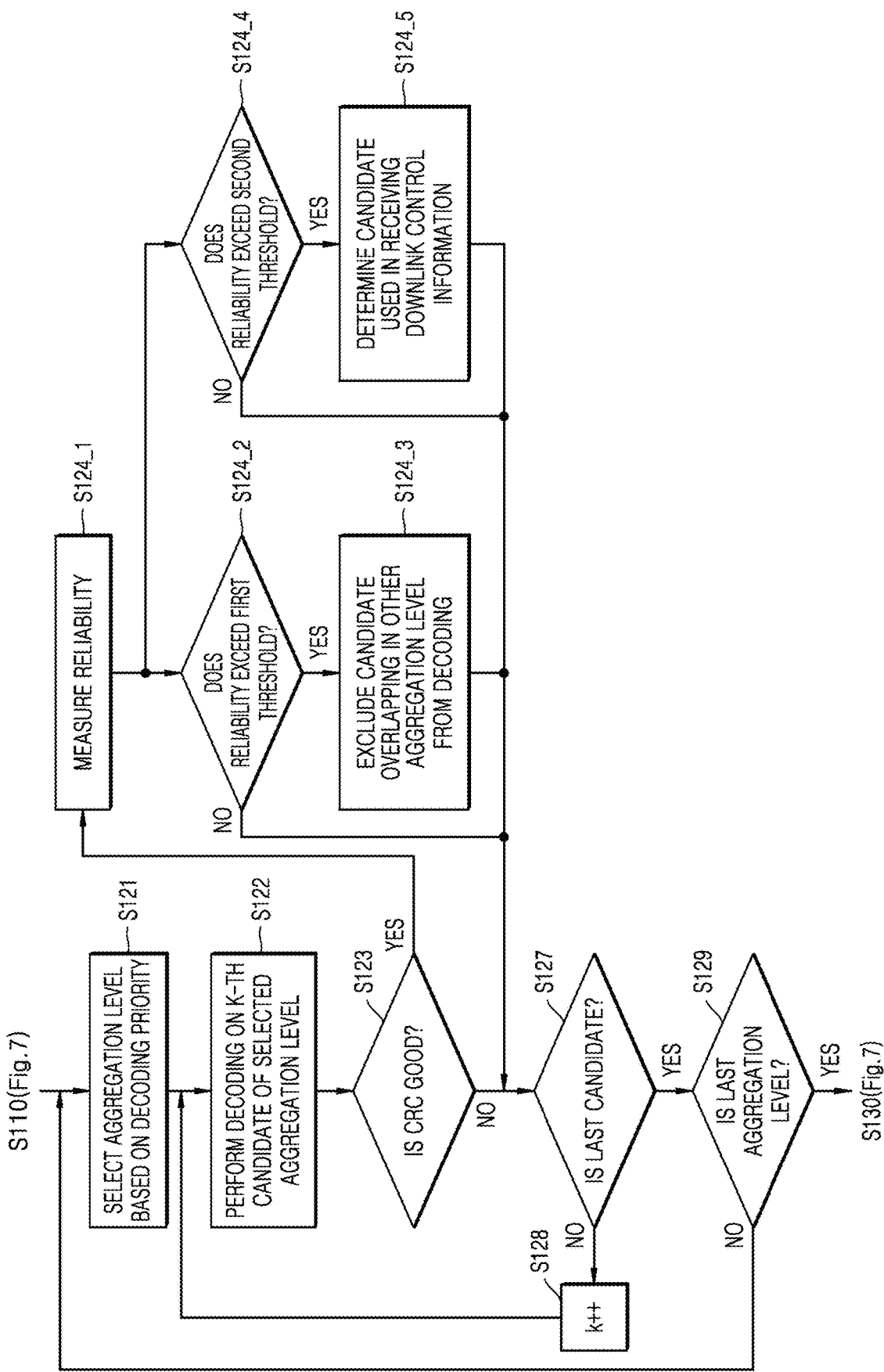
FIG. 10 is a flowchart additionally illustrating a method of receiving downlink control information (DCI) using a second threshold from FIG. 9.

FIG. 10 is a flowchart additionally illustrating a method of receiving DCI using a second threshold from FIG. 9. Hereinafter, descriptions redundant with those of FIG. 9 will be omitted.

Referring to FIG. 10, in operation S124_4 after operation S124_1, a terminal may determine whether the reliability of a k-th candidate exceeds the second threshold. In embodiments, the second threshold may be the same as or different from a first threshold. For example, the first threshold may be set to be greater than the second threshold, so that operation S124_3 may be performed under a more strict condition than operation S124_5. As another example, the first threshold may be set smaller than the second threshold, so that operation S124_3 may be performed under a rougher condition than operation S124_5. When a result of operation S124_4 is 'YES', following operation S124_5, the terminal may determine the k-th candidate as a candidate used for receiving the DCI. When the result of operation S124_4 is 'NO', or following operation S127 after operation S124_5, the terminal may determine whether the k-th candidate is the last candidate of a selected aggregation level. According to embodiments, when the result of operation S124_2 is 'NO', operation 124_4 may be followed and, when the result of operation 124_4 is 'NO', operation 127 may be followed. According to embodiments, when the result of operation S124_4 is 'NO', operation 124_2 may be followed and, when the result of operation 124_2 is 'NO', operation 127 may be followed.

Figure 11:
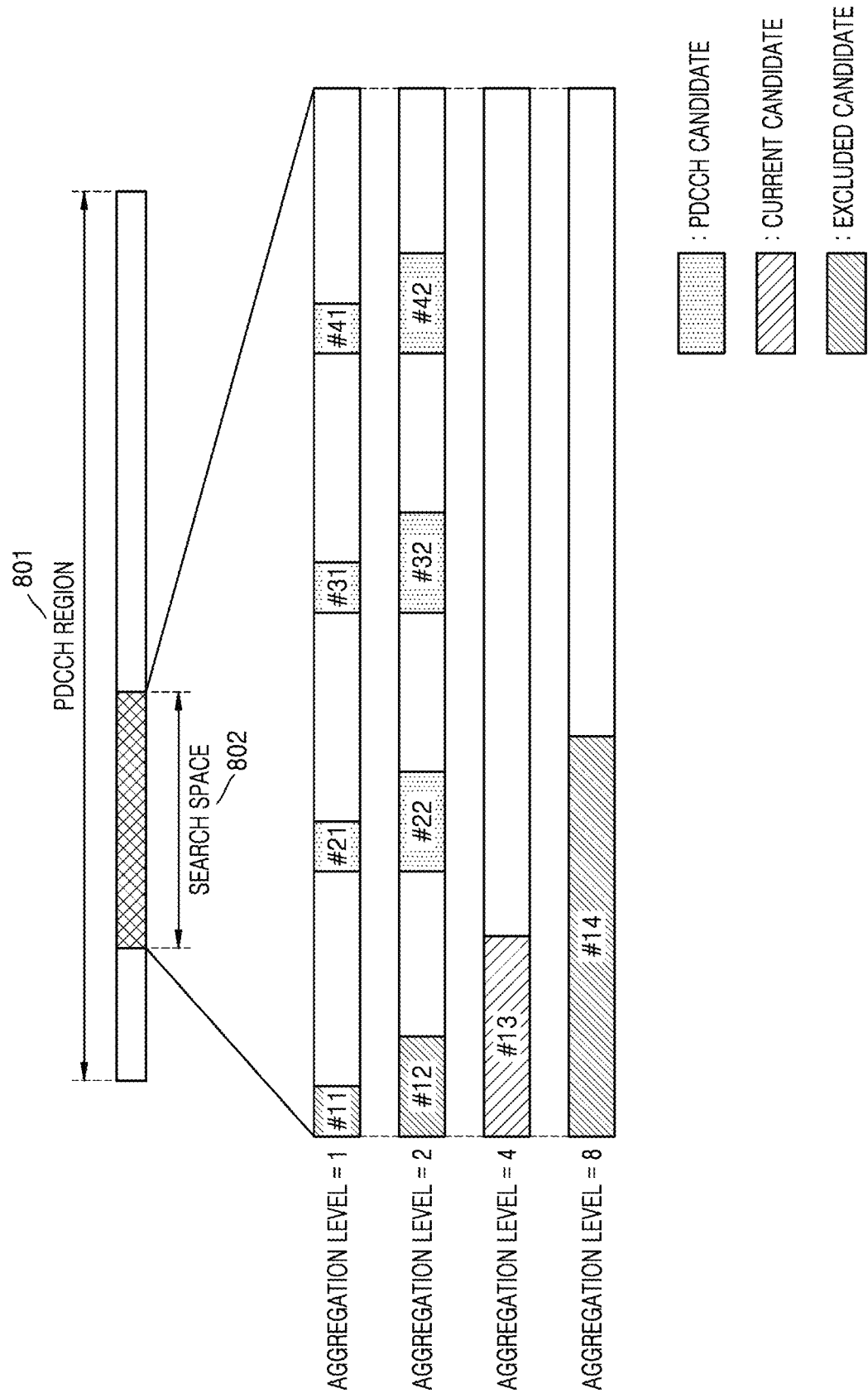
FIG. 11 is a diagram illustrating an operation of excluding overlapping candidates from blind decoding according to embodiments of the inventive concepts.

FIG. 11 is a diagram illustrating an operation of excluding overlapping candidates from blind decoding according to embodiments of the inventive concepts.

Referring to FIG. 11, a terminal may selectively perform decoding on the ninth candidate #13 of the aggregation level '4' based on a decoding priority. As a result of decoding with respect to the ninth candidate #13, when it is determined that a CRC is good and a reliability exceeds a first threshold, the terminal may exclude the first, fifth and tenth candidates #11, #12, and #14 including at least one CCE overlapping the ninth candidate #13 from blind decoding. The above exclusion operation may also be performed in decoding with respect to other aggregation levels.

Figure 12:
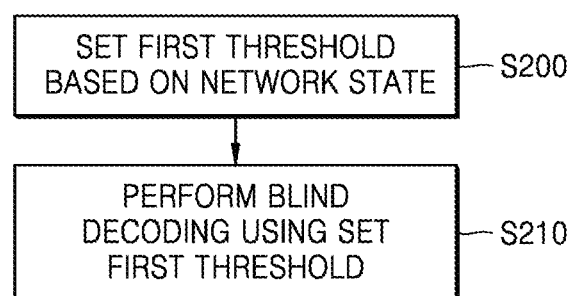
FIG. 12 is a flowchart illustrating an operating method of a terminal using a first threshold according to embodiments of the inventive concepts.

FIG. 12 is a flowchart illustrating an operating method of a terminal using a first threshold according to embodiments of the inventive concepts.

Referring to FIG. 12, in operation S200, the terminal may set the first threshold based on a network state with a base station. The network state considered for setting the first threshold may include a state of a downlink channel between the terminal and the base station, and/or a battery state of the terminal. In operation S210, the terminal may perform blind decoding for detection of a PDCCH using the set first threshold.

Meanwhile, the terminal may periodically or aperiodically repeat operation S200 to set the first threshold adaptive to the network state.

Figure 13A:
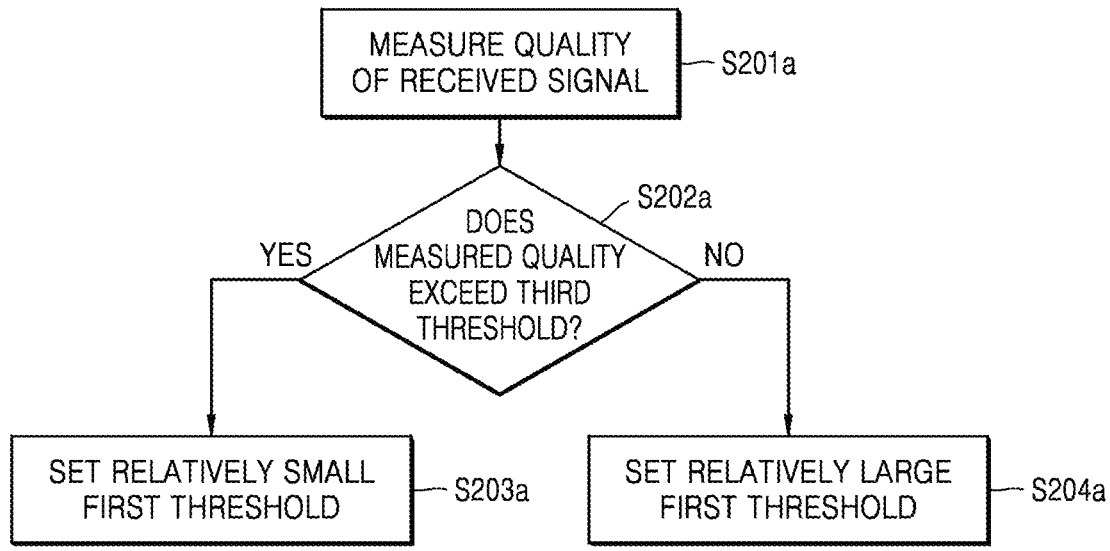
FIGS. 13A and 13B are detailed flowcharts illustrating embodiments of FIG. 12.
Figure 13B:
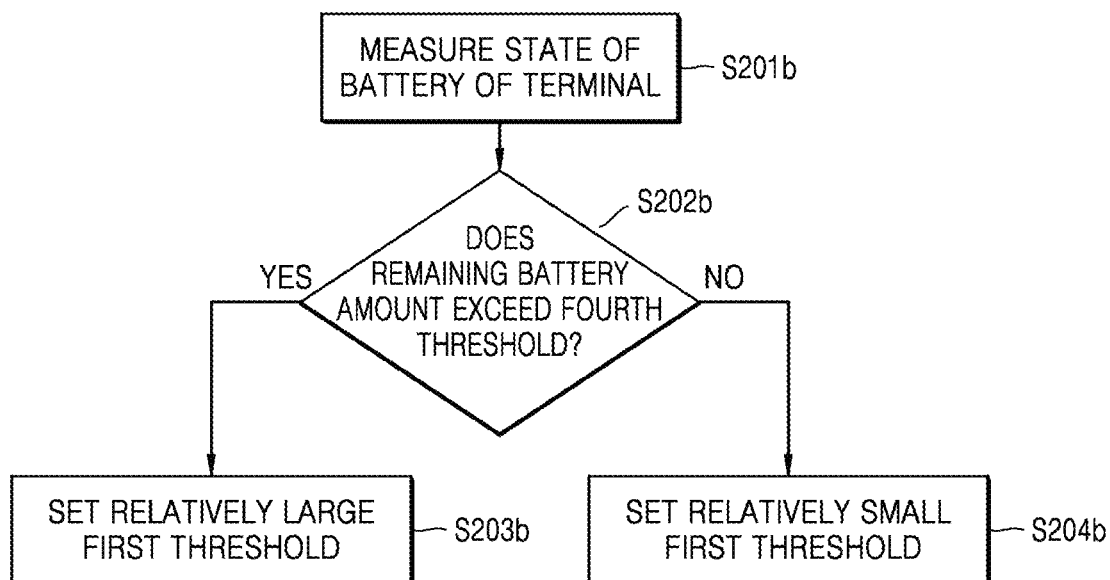

FIGS. 13A and 13B are detailed flowcharts illustrating embodiments of FIG. 12.

Referring to FIG. 13A, in operation S201a, a terminal may measure the quality of a signal received from a base station. The quality of the received signal may be an indicator for determining a state of a downlink channel. In operation S202a, the terminal may determine whether the measured quality exceeds a third threshold. When a result of operation S202a is 'YES', in operation S203a, the terminal may set a relatively small first threshold (e.g., decrease the first threshold). That is, the terminal may detect the PDCCH relatively easily when the state of the downlink channel is good, and thus a small first threshold may be set to exclude overlapping candidates from blind decoding as many as possible, thereby simplifying a blind decoding operation. When the result of operation S202a is 'NO', in operation S204a, the terminal may set a relatively large first threshold (e.g., increase the first threshold). That is, the terminal may not easily detect the PDCCH when the state of the downlink channel is not good, and thus a large first threshold may be set to perform blind decoding on candidates as many as possible, thereby increasing the probability of success of receiving DCI.

Referring to FIG. 13B, in operation S201b, the terminal may measure a state of a battery. In operation S202b, the terminal may determine whether the remaining battery amount exceeds a fourth threshold. When a result of operation S202b is 'YES', in operation S203b, the terminal may set a relatively large first threshold (e.g., increase the first threshold). That is, because the remaining battery amount is sufficient, the terminal may perform blind decoding on many candidates, and thus a large first threshold may be set, thereby maximizing or increasing the probability of receiving the DCI. When the result of operation S202b is 'NO', in operation S204b, the terminal may set a relatively small first threshold (e.g., decrease the first threshold). That is, because the remaining battery amount is not sufficient, the terminal may simplify candidates targeted for blind decoding, thereby reducing power consumed for blind decoding.

However, embodiments of FIGS. 13A and 13B are only examples, and the inventive concepts are not limited thereto, and the first threshold may be variously set in consideration of more factors and communication environments.

Figure 14:
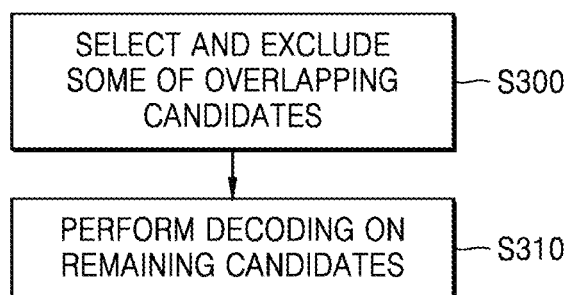
FIG. 14 is a flowchart illustrating a blind decoding method of a terminal according to embodiments of the inventive concepts.

FIG. 14 is a flowchart illustrating a blind decoding method of a terminal according to embodiments of the inventive concepts.

Referring to FIG. 14, in operation S300, the terminal may select some of candidates overlapping with a currently decoded candidate and exclude the selected candidates from blind decoding. For example, aggregation levels may include first to third aggregation levels, as a result of performing decoding on the first aggregation level first, when it is determined that a first candidate of the first aggregation level has a good CRC, and has a reliability exceeding a first threshold, the terminal may select any one of the second and third aggregation levels and exclude a candidate overlapping with the first candidate among candidates of the selected aggregation level from blind decoding. That is, the terminal may not exclude all candidates overlapping with the currently decoded candidate from blind decoding but select and exclude only some of all the overlapping candidates. In operation S310, the terminal may perform decoding on the other candidates that are not excluded.

Figure 15:
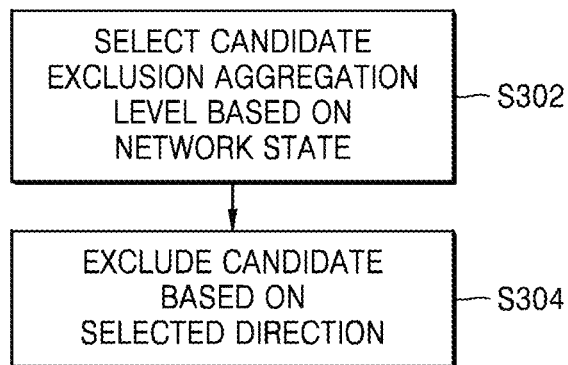
FIG. 15 is a detailed flowchart illustrating embodiments of FIG. 14.

FIG. 15 is a detailed flowchart illustrating embodiments of FIG. 14.

Referring to FIG. 15, in operation S302, a terminal may select a candidate exclusion aggregation level based on a network state. In embodiments, the network state may include a state of a downlink channel between the terminal and a base station. As an example, when the state of the downlink channel is not good, the terminal may select a candidate exclusion aggregation level direction so that overlapping candidates of an aggregation level lower than an aggregation level to be currently decoded are excluded. As another example, when the state of the downlink channel is good, the terminal may select the candidate exclusion aggregation level direction so that overlapping candidates of an aggregation level higher than the aggregation level to be currently decoded are excluded. In operation S304, the terminal may exclude a candidate based on the selected candidate exclusion aggregation level (e.g., the selected aggregation level direction).

Figure 16A:
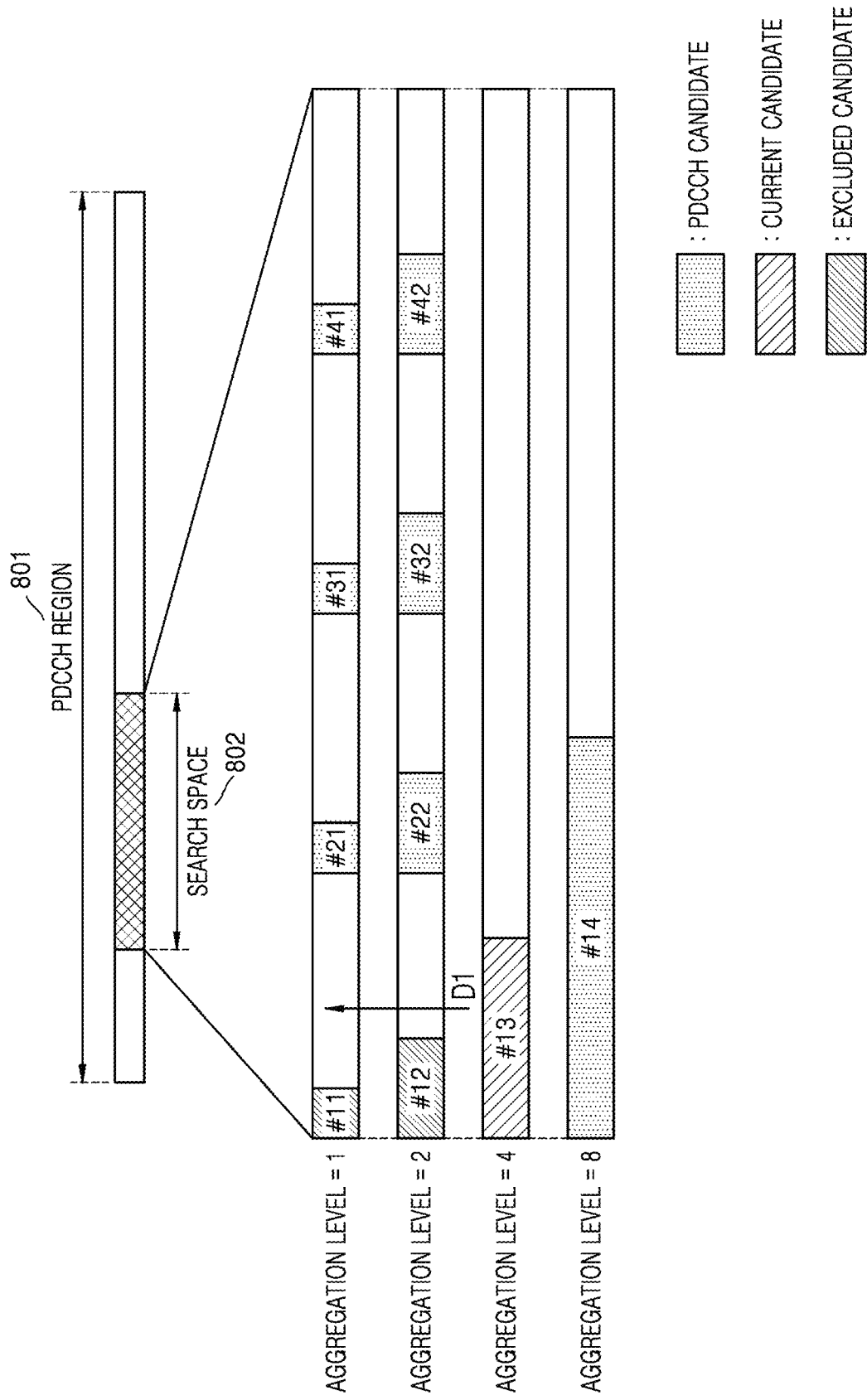

FIGS. 16A and 16B are detailed diagrams illustrating embodiments of FIG. 15. Hereinafter, descriptions redundant with those of FIGS. 6A and 11 will be omitted.

Referring to FIG. 16A, a terminal may exclude only the candidates #11 and #12 of the aggregation levels '1' and '2' corresponding to a level direction D1 lower than the aggregation level '4' among the candidates #11, #12, and #14 overlapping with the ninth candidate #13 of the aggregation level '4' on which decoding is currently performed from blind decoding.

Referring to FIG. 16B, the terminal may exclude only the candidate #14 of the aggregation level '8' corresponding to a level direction D2 higher than the aggregation level '4' among the candidates #11, #12, and #14 overlapping with the ninth candidate #13 of the aggregation level '4' on which decoding is currently performed from blind decoding.

Figure 17:
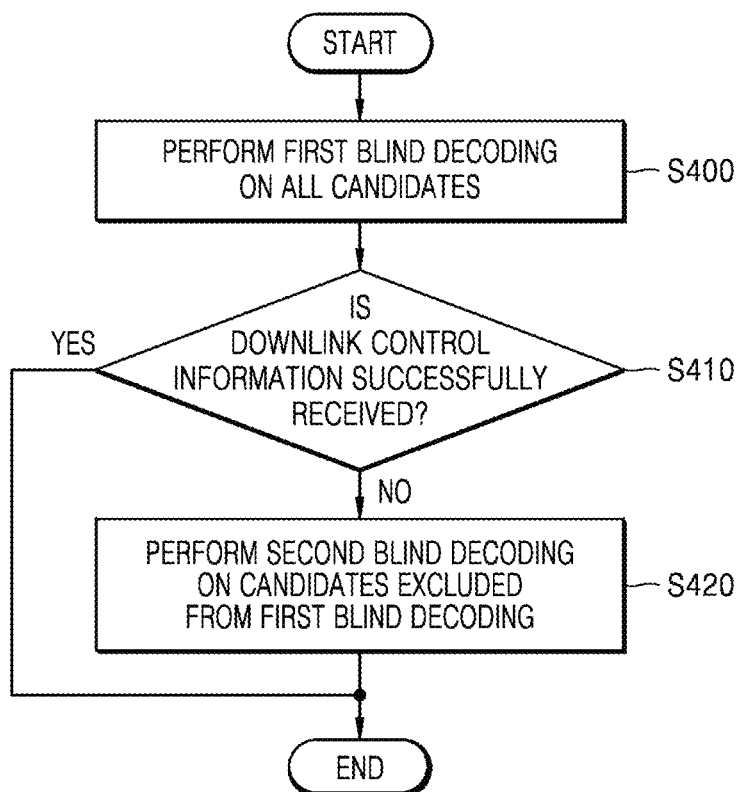
FIG. 17 is a flowchart illustrating an operating method of a terminal according to embodiments of the inventive concepts.

FIG. 17 is a flowchart illustrating an operating method of a terminal according to embodiments of the inventive concepts.

Referring to FIG. 17, in operation S400, the terminal may perform primary blind decoding on all candidates (e.g., all non-excluded candidates) of aggregation levels based on a decoding priority. In operation S410, the terminal may determine whether DCI has been successfully received. When a result of operation S410 is 'YES', the terminal may end blind decoding in the corresponding TTI. When the result of operation S410 is 'NO', the terminal may perform second blind decoding on candidates excluded from first blind decoding in operation S420. In embodiments, second blind decoding may be candidate filtering-based blind decoding in the same manner as, or a similar manner to, first blind decoding. In embodiments, the terminal may perform second blind decoding on all candidates excluded from first blind decoding differently from first blind decoding.

Figure 18:
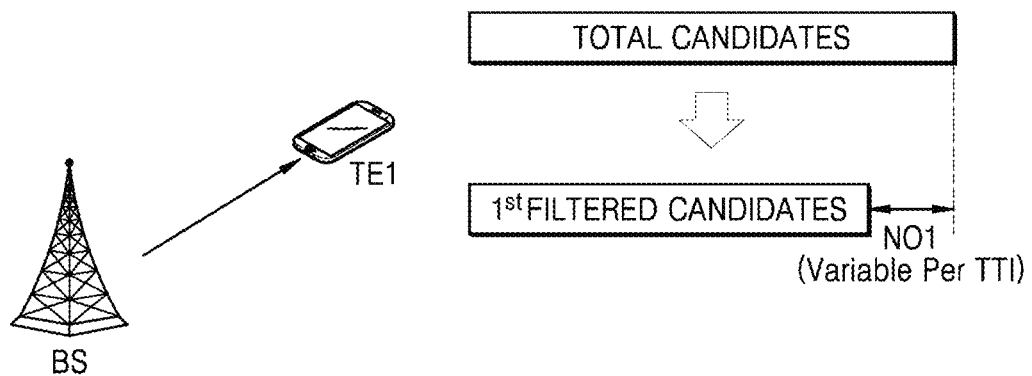
FIGS. 18 and 19 are diagrams illustrating an operating method of a communication system according to embodiments of the inventive concepts.
Figure 19:
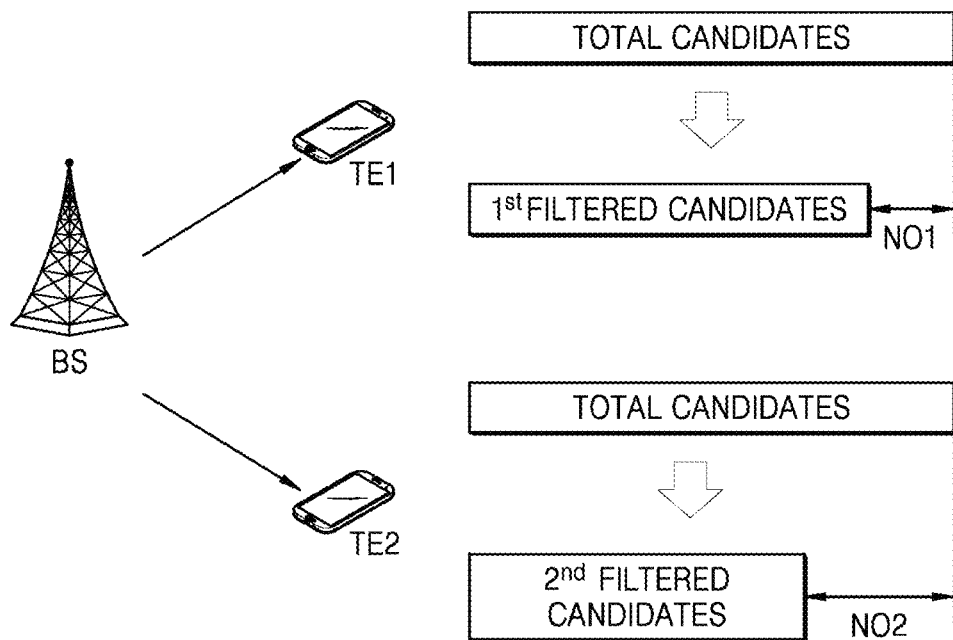

FIGS. 18 and 19 are diagrams illustrating an operating method of a communication system according to embodiments of the inventive concepts.

Referring to FIG. 18, the communication system may include a base station BS and a first terminal TE1. The first terminal TE1 may receive a first PDCCH from the base station BS. The first terminal TE1 may perform blind decoding to detect the first PDCCH. As described above, the first terminal TE1 may determine a decoding priority with respect aggregation levels based on reference information, and perform candidate filtering-based blind decoding on each of candidates of the aggregation levels according to the decoding priority.

In embodiments, the first terminal TE1 may filter candidates among all candidates assigned from the base station BS to select first filtered candidates, and perform blind decoding on the first filtered candidates. Meanwhile, the first terminal TE1 may adjust the number NO1 of candidates excluded from blind decoding for each TTI according to a network state with the base station BS. For example, the first terminal TE1 may variably adjust the number NO1 by using a method of adaptively setting a first threshold described in FIG. 12.

Referring to FIG. 19, the communication system may further include a second terminal TE2. The first terminal TE2 may receive a second PDCCH from the base station BS. The second terminal TE2 may perform blind decoding to detect the second PDCCH. As described above, the second terminal TE2 may determine a decoding priority with respect aggregation levels based on reference information, and perform candidate filtering-based blind decoding on each of candidates of the aggregation levels according to the decoding priority.

In embodiments, the second terminal TE2 may filter candidates among all candidates assigned from the base station BS to select second filtered candidates, and perform blind decoding on the second filtered candidates. Meanwhile, the second terminal TE2 may adjust the number NO2 of candidates excluded from blind decoding for each TTI according to a network state with the base station BS.

In embodiments, the number NO1 of candidates excluded from the first terminal TE1 may be different from the number of candidates NO2 excluded from the second terminal TE2 in consideration of differences in a decoding history of each of the first and second terminals TE1 and TE2, the network state including a state of a downlink channel, etc.

Figure 20:
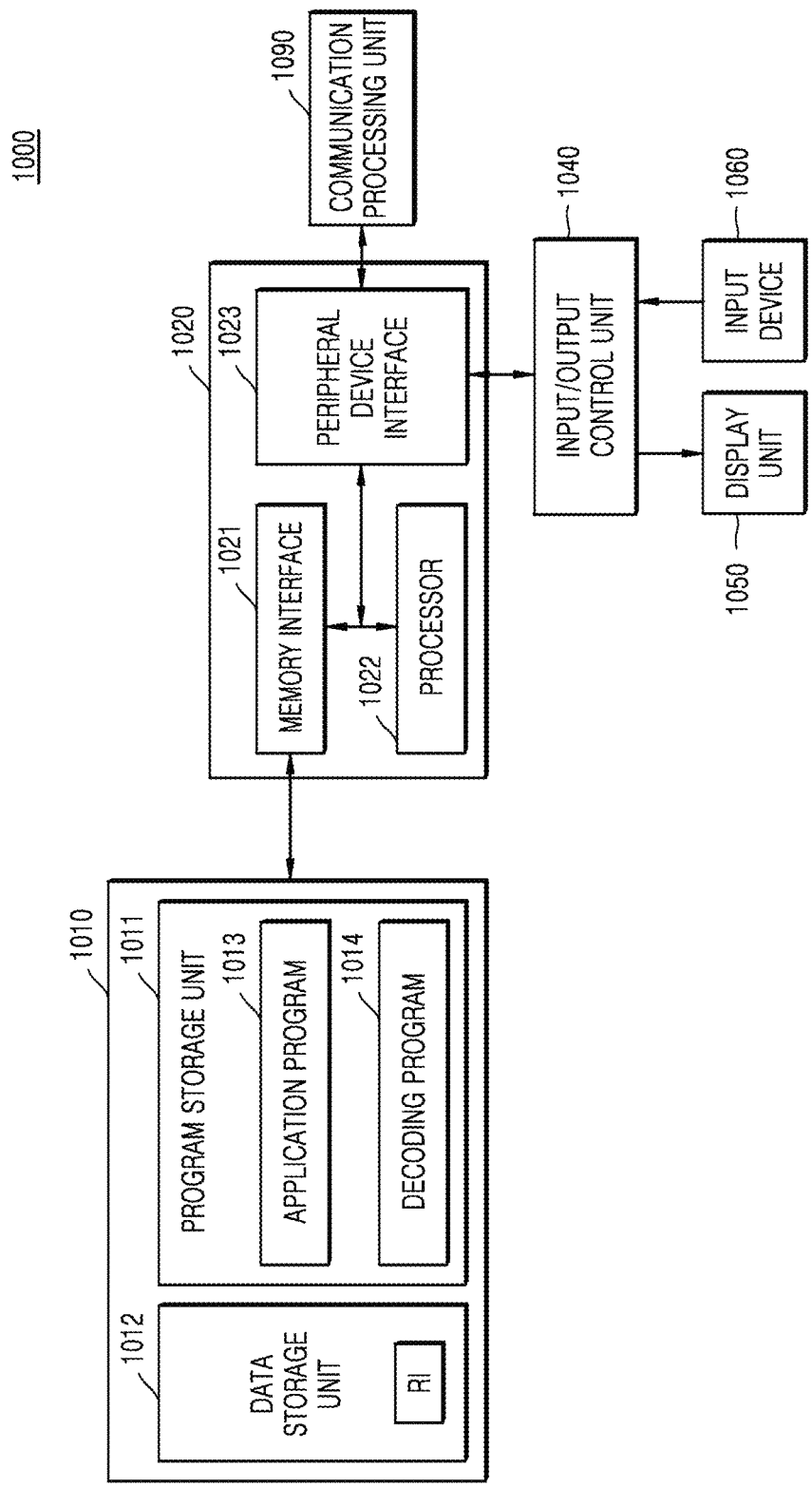
FIG. 20 is a block diagram illustrating an electronic device according to embodiments of the inventive concepts.

FIG. 20 is a block diagram illustrating an electronic device 1000 according to embodiments of the inventive concepts.

Referring to FIG. 20, the electronic device 1000 may include a memory 1010, a processor unit 1020, an input/output control unit 1040, a display unit 1050, an input device 1060, and/or a communication processing unit 1090. Here, the electronic device 1000 may include a plurality of memories 1010. Each element is as follows.

The memory 1010 may include a program storage unit 1011 that stores a program for controlling an operation of the electronic device 1000, and a data storage unit 1012 that stores data generated during execution of the program. The data storage unit 1012 may store data used for the operation of an application program 1013 and a decoding program 1014. In embodiments, the data storage unit 1012 may store reference information RI of the electronic device 1000 for blind decoding according to embodiments of the inventive concepts. Also, the reference information RI may be periodically or aperiodically updated.

The program storage unit 1011 may include the application program 1013 and the decoding program 1014. Here, the program included in the program storage unit 1011 may be expressed as an instruction set. The application program 1013 may include program codes for executing various applications operating in the electronic device 1000. That is, the application program 1013 may include codes (or commands) related to various applications driven by the processor 1022. The decoding program 1014 may include control codes for performing blind decoding according to embodiments of the inventive concepts.

In embodiments, the processor 1022 may determine a decoding priority of aggregation levels by executing the decoding program 1014 and perform candidate filtering-based blind decoding based on the decoding priority.

Meanwhile, the electronic device 1000 may include a communication processing unit 1090 that performs a communication function for sound communication and data communication. The processor 1022 may receive a PDCCH including DCI from a base station through the communication processing unit 1090.

A peripheral device interface 1023 may control a connection between the input/output control unit 1040, the communication processing unit 1090, the processor 1022, and/or the memory interface 1021. The processor 1022 may control a plurality of base stations to provide corresponding services using at least one software program. In this regard, the processor 1022 may execute at least one program stored in the memory 1010 to provide a service corresponding to the corresponding program.

The input/output control unit 1040 may provide an interface between an input/output device such as the display unit 1050 and the input device 1060 and the peripheral device interface 1023. The display unit 1050 displays state information, input characters, moving pictures, still pictures, etc. For example, the display unit 1050 may display application program information driven by the processor 1022.

The input device 1060 may provide input data generated by selection of an electronic device to the processor unit 1020 through the input/output control unit 1040. In this case, the input device 1060 may include a keypad including at least one hardware button and a touch pad sensing touch information. For example, the input device 1060 may provide touch information, such as a touch, a touch movement, and a touch release, sensed through the touch pad, to the processor 1022 through the input/output control unit 1040.

Figure 21:
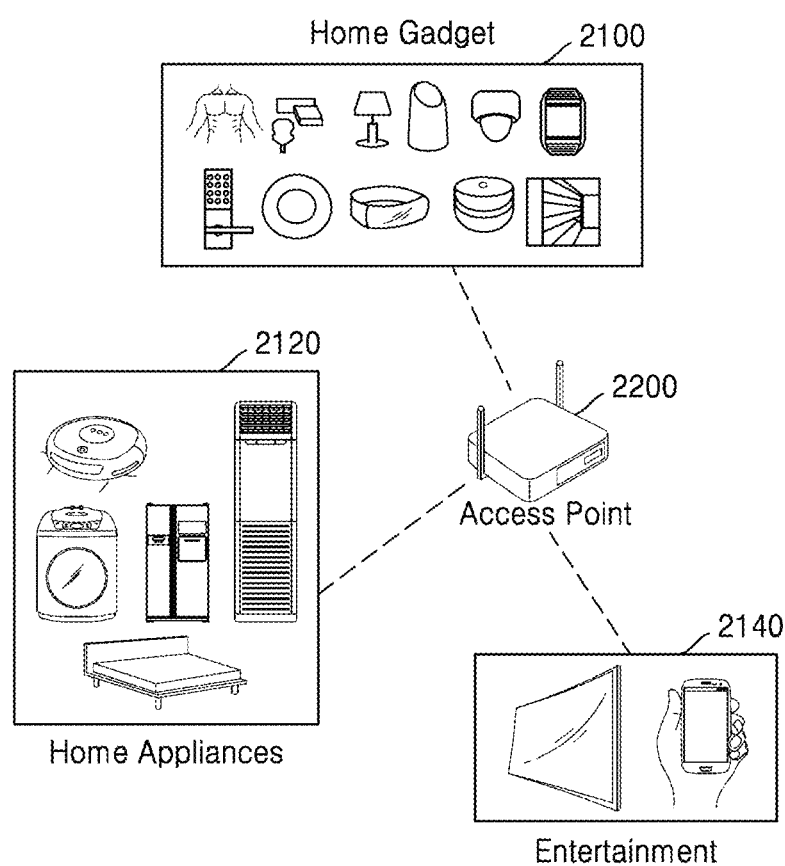
FIG. 21 is a diagram illustrating communication devices performing a decoding operation according to embodiments of the inventive concepts.

FIG. 21 is a diagram illustrating communication devices performing a decoding operation according to embodiments of the inventive concepts.

Referring to FIG. 21, a home gadget 2100, a home appliance 2120, an entertainment device 2140, and/or an access point (AP) 2200 may each perform a decoding operation according to embodiments of the inventive concepts. In embodiments, the home gadget 2100, the home appliance 2120, the entertainment device 2140, and/or the AP 2200 may configure an Internet of Things (IoT) network system. It will be understood that the communication devices shown in FIG. 21 are only examples, and other communication devices not shown in FIG. 21 may also include a wireless communication device according to embodiments of the inventive concepts.

Conventional devices for receiving downlink control information from a base station perform blind decoding on all control channel candidates included in each of a plurality of aggregation levels. Accordingly, the conventional devices consume excessive amounts of resources (e.g., power, processor, memory, delay, etc.) during decoding, especially when higher numbers of aggregation levels are used.

However, according to embodiments, improved devices are provided for receiving downlink control information from a base station. For example, the improved devices may decode control channel candidates according to a priority order of aggregation levels based on a decoding history, and exclude an overlapping control channel candidate from the decoding. Accordingly, the improved devices are able to receive the downlink control information while performing fewer decoding operations as compared to the conventional devices. Thus, the improved devices overcome the deficiencies of the conventional devices to reduce resource consumption (e.g., power, processor, memory, delay, etc.) during decoding, especially when higher numbers of aggregation levels are used.

According to embodiments, operations described herein as being performed by the base station 10, the terminal 100, the RFIC 110, the baseband IC 120, the processor 130, the decoding circuit 132, the electronic device 1000, the processor unit 1020, the input/output control unit 1040, the communication processing unit 1090, the memory interface 1021, the processor 1022, the peripheral device interface 1023, the home gadget 2100, the home appliance 2120, the entertainment device 2140, and/or the AP 2200 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While inventive concepts has been particularly shown and described with reference to embodiments thereof, it will be understood that various changes in form and details may be made therein without departing from the spirit and scope of the following claims.

What is claimed is:

1. An operating method of a terminal, the operating method comprising:
  determining a decoding priority of a plurality of aggregation levels based on reference information, the plurality of aggregation levels corresponding to a downlink control channel;
  performing candidate filtering-based blind decoding on one or more control channel candidates corresponding to the plurality of aggregation levels according to the decoding priority to obtain a decoding result; and
  receiving downlink control information based on the decoding result, wherein
  the plurality of aggregation levels comprise a first aggregation level, a second aggregation level lower than the first aggregation level and a third aggregation level higher than the first aggregation level, and
  the performing candidate filtering-based blind decoding comprises performing decoding on a first control channel candidate of the first aggregation level to obtain a first decoding result, the first control channel candidate being among the one or more control channel candidates, and
  selecting one among a second control channel candidate of the second aggregation level and a third control channel candidate of the third aggregation level to be excluded from blind decoding based on a network state in response to determining the first decoding result exceeds a first threshold, the network state corresponding to a comparison result between a measured signal quality and a second threshold,
  wherein the first control channel candidate overlaps with the second and third control channel candidates.

2. The operating method of claim 1, wherein the reference information comprises a blind decoding history in at least one previous transmission time interval (TTI), the blind decoding history indicating a number of control channel candidates corresponding to a successfully verified cyclic redundancy check (CRC) for each of the plurality of aggregation levels.

3. The operating method of claim 1, wherein the reference information indicates a frequency of use of a format by a base station to transmit the downlink control channel.

4. The operating method of claim 1, wherein the reference information indicates a state of a downlink channel with a base station, the downlink control channel being received from the base station.

5. The operating method of claim 1, wherein
the plurality of aggregation levels further comprise a fourth aggregation level; and
the performing candidate filtering-based blind decoding further comprises excluding at least one fourth control channel candidate overlapping with the first control channel candidate among a plurality of fourth control channel candidates included in the fourth aggregation level from the candidate filtering-based blind decoding based on the first decoding result.

6. The operating method of claim 5, wherein the excluding the at least one fourth control channel candidate excludes the at least one fourth control channel candidate in response to determining the first decoding result indicates a successful CRC verification and that a reliability exceeds the first threshold.

7. The operating method of claim 6, wherein the receiving the downlink control information receives the downlink control information using a particular control channel candidate corresponding to a successful CRC verification and having a reliability exceeding a third threshold.

8. The operating method of claim 7, wherein the first threshold is different from the third threshold.

9. The operating method of claim 5, wherein the performing the candidate filtering-based blind decoding performs decoding on remaining ones of the plurality of fourth control channel candidates other than the at least one fourth control channel candidate.

10. The operating method of claim 5, further comprising:
performing candidate filtering-based blind decoding on the at least one fourth control channel candidate in response to a failure to receive the downlink control information.

11. The operating method of claim 1, wherein the first threshold is variably set based on the network state.

12. The operating method of claim 1, wherein the first threshold is variably set based on a state of battery of the terminal.

13. A terminal comprising:
processing circuitry configured to,
determine a decoding priority with respect to a plurality of aggregation levels based on reference information, the plurality of aggregation levels corresponding to a downlink control channel,
perform candidate filtering-based blind decoding on one or more control channel candidates corresponding to the plurality of aggregation levels according to the decoding priority to obtain a decoding result, and
receive downlink control information based on the decoding result, wherein
the plurality of aggregation levels comprise a first aggregation level, a second aggregation level lower than the first aggregation level and a third aggregation level higher than the first aggregation level, and
the processing circuitry is configured to
perform the candidate filtering-based blind decoding including performing decoding on a first control channel candidate of the first aggregation level to obtain a first decoding result, the first control channel candidate being among the one or more control channel candidates and
select one among a second control channel candidate of the second aggregation level and a third control channel candidate of the third aggregation level to be excluded from blind decoding based on a network state in response to determining the first decoding result exceeds a first threshold, the network state corresponding to a comparison result between a measured signal quality and a second threshold,
wherein the first control channel candidate overlaps with the second and third control channel candidates.

14. The terminal of claim 13, wherein the reference information comprises history information indicating results of blind decoding in at least one previous transmission time interval (TTI) or indicating a frequency of use of formats by a base station to transmit the downlink control channel.

15. The terminal of claim 13, wherein the reference information indicates a state of a downlink channel with a base station, the downlink control channel being received from the base station.

16. The terminal of claim 13, wherein the processing circuitry is configured to exclude at least one control channel candidate among the one or more control channel candidate overlapping with a first control channel candidate among the one or more control channel candidate, the first control channel candidate corresponding to a successful cyclic redundancy check (CRC) verification and having a reliability exceeding the first threshold.

17. The terminal of claim 16, wherein the processing circuitry is configured to variably set the first threshold based on the network state.

18. The terminal of claim 16, wherein the processing circuitry is configured to:
select a candidate exclusion aggregation level direction based on the network state; and
exclude the at least one control channel candidate based on the candidate exclusion aggregation level direction.

19. The terminal of claim 16, wherein the processing circuitry is configured to perform candidate filtering-based blind decoding on the at least one control channel candidate in response to a failure to receive the downlink control information.

20. A communication system comprising:
a base station; and
a first terminal connected to the base station,
wherein the base station is configured to transmit a first downlink control channel to the first terminal, and
wherein the first terminal is configured to
perform first candidate filtering-based blind decoding on a plurality of first control channel candidates corresponding to a plurality of aggregation levels based on a first priority, the plurality of aggregation levels corresponding to the first downlink control channel, and
receive first downlink control information, wherein
the plurality of aggregation levels comprise a first aggregation level, a second aggregation level lower than the first aggregation level and a third aggregation level higher than the first aggregation level, and
the first terminal is configured to
perform the first candidate filtering-based blind decoding including performing decoding on a first control channel candidate of the first aggregation level to obtain a first decoding result, the first control channel candidate being among the plurality of first control channel candidates, and
select one among a second control channel candidate of the second aggregation level and a third control channel candidate of the third aggregation level to be excluded from blind decoding based on a network state in response to determining the first decoding result exceeds a first threshold, the network state corresponding to a comparison result between a measured signal quality and a second threshold, wherein the first control channel candidate overlaps with the second and third control channel candidates.

\* \* \* \* \*